US 6,666,476 B2

(12) United States Patent
Rink et al.

(10) Patent No.: US 6,666,476 B2
(45) Date of Patent: Dec. 23, 2003

(54) EXPANDABLE FLUID INFLATOR DEVICE WITH PYROTECHNIC COATING

(75) Inventors: Karl K. Rink, Princeton, ID (US); David J. Green, Bringham, UT (US); Robert D. Taylor, Hyrum, UT (US); Ivan V. Mendenhall, Providence, UT (US); William B. Richardson, Glendale, AZ (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/295,207

(22) Filed: Nov. 15, 2002

(65) Prior Publication Data

US 2003/0070574 A1 Apr. 17, 2003

Related U.S. Application Data

(63) Continuation-in-part of application No. 09/650,786, filed on Aug. 30, 2000.

(51) Int. Cl.[7] .......................... B60R 21/28; C06B 31/02; C06D 5/00
(52) U.S. Cl. ..................... 280/741; 149/61; 102/530
(58) Field of Search ..................... 149/37, 61; 280/741; 102/530, 531

(56) References Cited

U.S. PATENT DOCUMENTS

| | | |
|---|---|---|
| 4,116,466 A | 9/1978 | Gehrig |
| 4,561,675 A | 12/1985 | Adams et al. |
| 4,698,107 A | 10/1987 | Goetz et al. |
| 4,806,180 A | 2/1989 | Goetz et al. |
| 5,034,070 A | 7/1991 | Goetz et al. |
| 5,106,772 A | 4/1992 | Lai |
| 5,273,313 A | 12/1993 | Klober et al. |
| 5,299,828 A | 4/1994 | Nakajima et al. |
| 5,322,018 A | 6/1994 | Hadden et al. |
| 5,610,444 A | 3/1997 | Austruy et al. |
| 5,668,345 A | 9/1997 | Schroeder et al. |
| 5,669,629 A | 9/1997 | Rink |
| 5,695,216 A | 12/1997 | Sandstrom et al. |
| 5,704,640 A | 1/1998 | Monk et al. |
| 5,750,922 A | 5/1998 | Seeger |
| 5,756,929 A | 5/1998 | Lundstrom et al. |
| 5,779,266 A | 7/1998 | Moore et al. |
| 5,834,679 A | 11/1998 | Seeger |
| 5,884,938 A | 3/1999 | Rink et al. |
| 5,941,562 A | 8/1999 | Rink et al. |
| 6,077,372 A | 6/2000 | Mendenhall et al. |
| 6,086,693 A | 7/2000 | Mendenhall et al. |
| 6,117,254 A | 9/2000 | Rink et al. |
| 6,132,480 A | 10/2000 | Barnes et al. |
| 6,165,296 A | 12/2000 | Mendenhall et al. |
| 6,189,927 B1 | 2/2001 | Mossi et al. |
| 6,244,623 B1 | 6/2001 | Moore et al. |

FOREIGN PATENT DOCUMENTS

| | | |
|---|---|---|
| DE | 41 16 877 | 11/1992 |
| DE | 195 31 288 | 2/1997 |
| EP | 710 637 | 5/1996 |
| EP | 584 921 | 10/1996 |
| EP | 870 746 | 10/1998 |
| WO | 93/11089 | 6/1993 |
| WO | 98/18742 | 5/1998 |
| WO | 00/46170 | 8/2000 |

*Primary Examiner*—Michael J. Carone
*Assistant Examiner*—Aileen B. Felton
(74) *Attorney, Agent, or Firm*—James D. Erickson; Sally J. Brown

(57) ABSTRACT

Inflator device assemblies containing an expandable fluid effective to provide a gaseous inflation medium also advantageously employ or incorporate a pyrotechnic material such as to augment or enhance at least one fill characteristic of the gaseous inflation medium. The pyrotechnic material is provided on a selected non-gas generant surface within the inflator device. Suitable pyrotechnic compositions may include a binder additive effective to adhere the pyrotechnic composition to a surface within the inflator device.

31 Claims, 10 Drawing Sheets

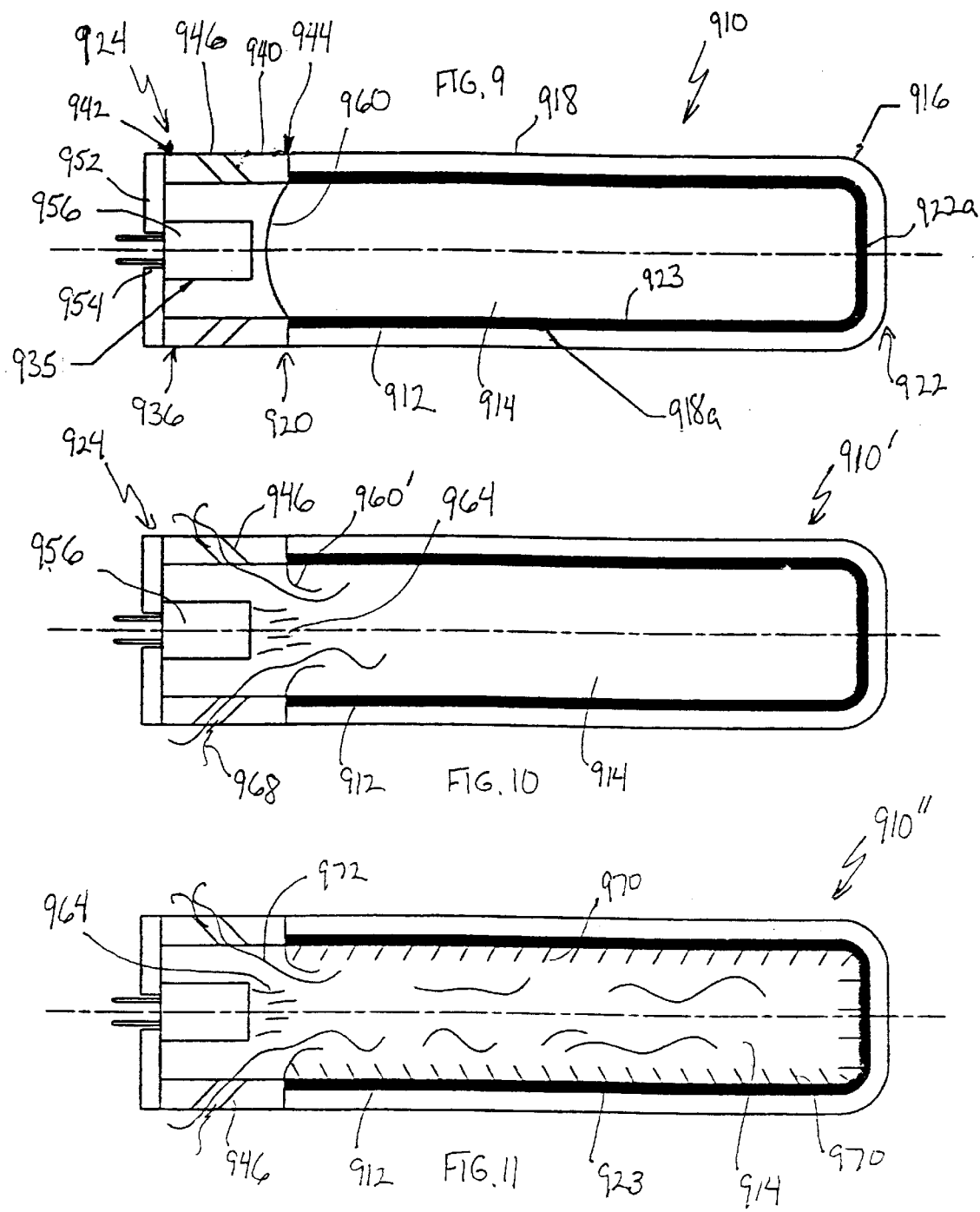

EXPANDABLE FLUID INFLATOR DEVICE WITH PYROTECHNIC COATING

CROSS REFERENCE TO RELATED APPLICATION

This application is a continuation-in-part application of U.S. application Ser. No. 09/650,786, filed on Aug. 30, 2000. The co-pending parent application is hereby incorporated by reference herein in its entirety and is made a part hereof, including but not limited to those portions which specifically appear hereinafter.

BACKGROUND OF THE INVENTION

This invention relates generally to gas generation, production or supply such as used in or in association with the inflation of inflatable devices such as inflatable vehicle occupant restraint airbag cushions used in vehicular inflatable restraint systems.

One particular aspect of this invention relates generally to the ignition of combustible materials and, more particularly, to the ignition of gas generant materials such as used in inflator devices used for the inflation of inflatable restraint airbag cushions.

It is well known to protect a vehicle occupant using a cushion or bag, e.g., an "airbag," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

Many types of inflator devices have been disclosed in the art for use in inflating one or more inflatable restraint system airbag cushions. Many prior art inflator devices include a solid form of gas generant material which is burned to produce or form gas used in the inflation of an associated airbag cushion.

Such inflator devices tend to involve rather complex ignition processes. For example, it is relatively common to employ an electrically initiated squib to ignite a separate charge of an igniter composition. The products of such ignition are then used to ignite the gas generant material. In practice, the ignition process of many various prior inflator devices require such a separate igniter charge because the squib does not itself generally supply sufficient hot gas, condensed phase particles or other ignition products to heat the gas generant material to result in the reaction of the material such as to result in desired gas generation.

FIG. 1 illustrates an inflator device or assembly generally designated by the reference numeral 10 and such as is known in the prior art. The inflator assembly 10 has a generally cylindrical external outline and includes a housing construction 12 such as formed of two structural components, i.e., a lower shell or base portion 14 and an upper shell or diffuser cap portion 16, such as may desirably be made of steel and appropriately joined or fastened together such as by application of an inertial welding operation. The housing 12 is illustrated in the general form of a flattened, disk-shaped circular cylinder typically or generally having a length to diameter ratio of about 0.5 or less. It will be appreciated that such a sized and shaped housing may most conveniently correspond to the shape of the vehicle steering wheel and can therefore facilitate assembly in an aesthetically pleasing manner.

The diffuser cap portion 16 is in the general form of an inverted bowl and includes a top wall 18 and a cylindrical sidewall 20. The sidewall 20 includes a plurality of spaced, preferably, generally uniformly spaced gas exit ports 22.

The base portion 14 includes a mounting opening 24, the use of which will be discussed in greater detail below. The base portion 14 also includes a peripheral bracket 28 that extends radially outward from the housing 12 and serves to form an interface attachment which is used to attach the inflator assembly 10 to a vehicle, the occupants of which are to be protected from injury such as may result from the impact of a collision.

The housing 12 is configured to define a generally cylindrical chamber 30. The chamber 30 contains or houses a supply of a gas generant material 32, such as composed of a pyrotechnic, such as known in the art, in a desired selected form. In FIG. 1, the gas generant 32 is shown as contained in the chamber 30 in a tablet form but other forms, such as known in the art may be used. Surrounding the gas generant material 32 is a filter assembly 34 such as includes a cooling screen or filter such as formed of multiple layers or wraps of metal screen.

The inflator assembly 10 also includes a retainer assembly 36 such as composed of a retainer 38 and annular-shaped diffuser and base damper pads, 40 and 42, respectively, and such as serving as construction expedients. For example, the inclusion of such a retainer assembly or specific components thereof may be useful and desired to retain the inflator assembly components in proper relative arrangement, prevent undesired gas flow passage through the assembly and/or minimize or avoid undesired contact of the gas generant within the assembly 10 such as may create undesired rattle or noise should the assembly be subjected to certain vibrations or other movements or forces. In practice, such damper pad elements are commonly composed or fabricated of a glass fiber material or the like.

Surrounding the filter 34 and generally adjacent the inner surface of the sidewall 20 is an adhesive-backed foil seal 44 which preferably hermetically seals the gas generant material 32 within the inflator 10, thereby protecting the gas generant material from possibly damaging ambient conditions, such as including moisture.

An igniter assembly, generally designated by the reference numeral 48, is mounted to the housing 12 in a location within the chamber 30 via the mounting opening 24. The igniter assembly 48 may take the form of a known pyrotechnic initiator device such as includes, as are known in the art, an igniter cup 50 having an interior 51 wherein is housed an igniter material 52, an igniter device or squib 54, and a squib adapter or holder 56 whereby the igniter assembly 48 is mounted to or mated with the housing 12. As shown, the igniter cup 50 and associated components of the igniter assembly 48 are inserted or fitted into or through an igniter tube 58. The igniter tube 58 can be formed of a gas-impermeable material, e.g., a metal such as plain carbon steel, and includes a plurality of spaced apart exit orifices 60 wherethrough products of ignition can be passed through and directed into contact with the gas generant material 32 to effect ignition and reaction thereof.

When actuated, the squib 54 causes ignition of the igniter material 52 which customarily results in an increase in pressure within the cup interior 51 with the subsequent predetermined rupturing or opening of the igniter cup 50 to permit passage, through the exit orifices 60, of ignition products produced by the combustion of the igniter material 52. With such passage, the ignition products are put into contact with the gas generant material 32 contained within the inflator chamber 30 such as to result in the ignition and reaction of the gas generant material 32. The gas generant material thus reacts to produce gas. The gas so produced passes through the filter 34, rupturing the foil seal 44 and passing through the gas exit ports 22 and out from the inflator assembly 10 into an associated airbag cushion (not shown). As will be appreciated, the contact of ignition products with the gas generant material can appropriately be, either or both, thermal or physical in nature.

In practice, the igniter assembly 48 can be formed by placing the igniter cup 50 containing the igniter material 52 over the igniter device/squib 54 and the holder 56. The igniter assembly 48 can be desirably placed at the mounting opening 24, such as with the igniter tube 58 in press fit relationship therewith, and joined to the housing 12 such as by welding the holder 56 to the base portion 14 at the mounting opening 24.

Such igniter charges have also been used in various dual stage or adaptive inflator assemblies. For example, FIG. 2 illustrates a dual stage or adaptive output inflator device or assembly generally designated by the reference numeral 210, such as generally disclosed in commonly assigned, co-pending U.S. patent application Ser. No. 09/465,082, the disclosure of which is hereby incorporated by reference. The inflator assembly 210 has various features in common with the inflator assembly 10, described above. In particular, the inflator assembly 210 has a generally cylindrical external outline and includes a housing construction 212 such as formed of a lower shell or base portion 214 and an upper shell or diffuser cap portion 216 and in the general form of a flattened, disk-shaped circular cylinder.

The diffuser cap portion 216 includes a top wall 218 and a cylindrical sidewall 220. The sidewall 220 includes a plurality of spaced gas exit ports 222. The base portion 214, in addition to a first mounting opening 224, however, also includes a second mounting opening 226. The base portion 214 includes a radially outward extending peripheral mounting or attachment bracket 228.

The housing 212 is configured to define a generally cylindrical first chamber 230 which contains or houses a supply of a first gas generant material 232, such as composed of a pyrotechnic. While the gas generant material 232 is shown in an extruded cylindrical perforated solid form, e.g., in the form of solids which include a cylindrical bore such that the gas generant material is generally tubular in shape, gas generant in other suitable forms can be used. Surrounding the gas generant material 232 is a filter assembly 234 such as includes a cooling screen or filter such as formed of multiple layers or wraps of metal screen.

The inflator assembly 210 also includes a retainer assembly 236 such as composed of a retainer 238, a diffuser damper pad 240 and a base damper pad 242. A foil seal 244, generally adjacent the inner surface of the sidewall 220, seals the gas generant material 232 within the inflator 210.

A first igniter assembly, generally designated by the reference numeral 248 and similar to the igniter assembly 48 described above, is mounted to the housing 212 in a location within the first chamber 230 via the mounting opening 224. The first igniter assembly 248 includes an igniter cup 250 having an interior 251 wherein is housed a supply of igniter material 252, an igniter device or squib 254, and a squib adapter or holder 256 whereby the igniter assembly 248 is mounted to or mated with the housing 212. The igniter cup 250 and associated components of the igniter assembly 248 are inserted or fitted into or through an igniter tube 258. The igniter tube 258, similar to the igniter tube 58 includes exit orifices (not shown) wherethrough products of ignition can be passed through and directed into contact with the gas generant material 232 to effect ignition and reaction thereof.

The first chamber 230 also houses or contains a second chamber 262. It is with respect to this second chamber and the construction and operation thereof that the inflator assembly 210 differs most significantly from the inflator assembly 10 described above. The second chamber 262 includes a generant cup 264, a lid closure 265, a second igniter device or squib 266, and a second squib adapter 268 whereby the second chamber 262 is mounted to or mates with the housing 212 at the second mounting opening 226.

The generant cup 264 and the lid closure 265 cooperate to form a generant cup interior 270 wherein desirably placed is a selected quantity of a second gas generant material 272. The second gas generant material 272 may typically be in the form of a pyrotechnic material and may be either the same or different in composition, shape, size or form, as compared to the first gas generant material 232.

The generant cup 264 desirably includes a generally cylindrical sidewall 274 and such as preferably includes a shoulder portion 276 such as formed therein. The lid closure 265 and the shoulder portion 276 may desirably form a press or interference fit form of attachment when in a static state or condition. The generant cup 264 and the lid closure 265 cooperate and function in a manner such as to prevent the combustion products resulting upon actuation of the first igniter device 254, to enter into the second chamber 262. Further, the generant cup 264 and the lid closure 265 desirably cooperate and function in a manner such as to permit the combustion products formed by reaction of the gas generant material contained within the second chamber 262, when properly and desirably actuated, to pass from the second chamber 262 out into the first chamber 230 and subsequently through the filter assembly 234 and out through the exit ports 222 into an associated airbag cushion (not shown).

For example, in a typical deployment operation involving actuation and firing of the second chamber 262, actuation of the second igniter squib 266 results in sufficient discharge to ignite at least some of the second gas generant material 272. The ignition and reaction of the second gas generant material in turn produces or results in sufficient pressure within the second chamber 262 to dislodge the lid closure 265 from the shoulder portion 276 such as to open the second chamber 262 to entry of combustion products formed by or as a result of actuation of the first chamber 230. Entry into the second chamber of such combustion products desirably can result in the more complete or full combustion of the remaining second gas generant material.

A common means of obtaining substantially simultaneously ignition of an extended length of an igniter composition charge is by means of an ignition cord. In practice, however, it is common that such a length of ignitor cord be housed or contained within an igniter tube extending within such an igniter charge.

While ignition of a gas generant material may ultimately be achieved through such an inclusion and use of an igniter charge, such assemblies and associated uses tend to undesirably complicate the ignition process as well as to complicate the manufacture, production and design of the associated inflator device. For example, such uses typically necessitate the manufacture of a container or other storage device to hold or store the igniter composition and then the incorporation of such a storage container in the inflator device. As will be appreciated, the incorporation and use of such an ignition process can detrimentally impact either or both the weight and cost of the corresponding apparatus hardware. Further, space is often at a premium in modern vehicle design. Consequently, it is generally desired that the space requirements for various vehicular components, including inflatable vehicle occupant restraint systems, be reduced or minimized to as great an extent as possible. The incorporation of an igniter assembly such as described above and associated support structures, may require a larger than desired volume of space within an associated inflator device. In particular, such volume of space could potentially be utilized to store or contain gas generant material and thereby permit the volume of space required by the inflator device to be reduced.

Thus, there is a need and a demand for alternative airbag inflator device ignition schemes and, in particular, there is a need and a demand for avoiding the requirement or inclusion of separate igniter composition charges and associated ignition trains or hardware. One approach discussed in the prior art has been to apply a coating of an igniter formulation directly on a gas generant material. For example, various patents, including U.S. Pat. Nos. 4,698,107; 4,806,180; and 5,034,070, disclose processing wherein an ignition coating is applied, such as in the form of a liquid or a water slurry, to azide-based gas generant materials. Such processing typically necessitates first the formation of the azide-based gas generant, including the proper forming and drying of gas generant grains in selected shapes, followed by the coating of the grains with a wet slurry of the ignition material, such as by immersion of the grains in a slurry of the coating material, and then final drying.

In such dip coat processing, generally either individual gas generant tablets or wafers are coated as they go through a coating slurry on a conveyer belt, or the gas generant tablets or wafers are put in bulk containers and submerged in the slurried coating material. These types of process are typically relatively slow and may lead to problems such as coated tablets/wafers sticking either or both to themselves and associated equipment, such as conveyer belts.

In addition, dependent on the shape of the gas generant tablet or wafer there may also be a problem in obtaining application of a uniform coating. For example, if the gas generant material has a relatively flat form, the slurry coating may tend to pool and may therefore dry to form a coating of variable thicknesses.

Also, dip coating equipment (e.g., dip baskets and conveyer belts) may easily be contaminated with igniter material, leading to potential or increased safety concerns.

In view of the above, there is a need and a demand for materials and processing techniques such as may facilitate or permit the inclusion of an igniter composition within an inflator device, such as the placement of an ignition composition onto a gas generant material having a selected form or to a non-gas generant surface within an inflator device, for example.

As identified above, many types of inflator devices have been disclosed in the art for use in the inflation of one or more inflatable restraint system airbag cushions. A common form or type of prior art inflator device includes gas generant material in a solid form and which solid gas generant material is burned to produce or form gas used in the inflation of an associated airbag cushion. For example, such inflators can generally produce or derive inflation gas via the combustion of a solid form gas generating material, i.e., a pyrotechnic. In practice, however, such gas generating materials can typically produce various undesirable combustion products, including various solid particulate materials. The removal of such solid particulate material, such as by the incorporation of various filtering devices within or about the inflator, can undesirably increase inflator design and processing complexity and can increase the costs associated therewith. In addition, the temperature of the gases emitted from such inflator devices can typically vary between 500° F. (260° C.) and 1200° F. (649° C.), dependent upon numerous interrelated factors including the desired level of inflator performance, as well as the type and amount of gas generant materials used. Consequently, airbag cushions used in conjunction with such inflator devices are commonly constructed of or coated with special materials which are resistant to such high temperatures. As will be appreciated, such specially fabricated or prepared airbag cushions typically are more costly to manufacture and produce.

Another category of inflator devices disclosed in the art for the inflation of one or more inflatable restraint system airbag cushions is often referred to as "compressed gas inflators" and refers to various inflators which contain a selected quantity of compressed gas. For example, one particular type of compressed gas inflator, commonly referred to as a "stored gas inflator," simply contains a quantity of a stored compressed gas which is selectively released to inflate an associated airbag cushion.

A second type of compressed gas inflator, commonly referred to as a "hybrid inflator," typically supplies or provides inflation gas as a result of a combination of stored compressed gas with the combustion products resulting from the combustion of a gas generating material, e.g., a pyrotechnic.

In the past, compressed gas inflators of various types have commonly been at a disadvantage, as compared to pyrotechnic inflators, in terms of size, weight and/or cost. This is especially significant in view of the general design direction toward relatively small, lightweight and economical modern vehicle components and assemblies. Thus, there is a continuing need and demand for further improved apparatus and techniques for inflating inflatable devices such as inflatable airbag cushions.

A more recently developed inflator device is at least in part the subject of commonly assigned Rink, U.S. Pat. No. 5,669,629, issued Sep. 23, 1997; Rink et al., U.S. Pat. No. 5,884,938, issued Mar. 23, 1999; and Rink et al., U.S. Pat. No. 5,941,562, issued Aug. 24, 1999, the disclosures of which patents are hereby and expressly incorporated herein in their entirety. In one form of such recently developed inflator device, inflation gas is produced or formed, at least in part, via the decomposition or dissociation of a selected gas source material, such as in the form of a compressed gas and such as via the input of heat from an associated heat source supply or device. Such an inflator device is sometimes referred to as a "dissociative inflator."

While compressed gas inflators and dissociative inflators have been generally successful in overcoming at least some of the problems or shortcomings associated with prior types or forms of inflator devices, further improvements are desired and are being sought. In particular, there is a need and a desire for inflator devices which while containing an expandable fluid effective to provide a gaseous inflation medium also advantageously employs or incorporates a pyrotechnic material such as to augment or enhance such gaseous inflation medium.

SUMMARY OF THE INVENTION

A general object of at least one aspect of the invention is to provide improved igniter compositions, inflator devices and methods for including an igniter material within an inflator device.

A more specific objective of the invention is to overcome one or more of the problems described above.

A general object of the invention can be attained, at least in part, through an improvement in igniter compositions used to ignite a gas generant material within an inflator device. As detailed below, such improvement in accordance with one embodiment of the invention involves including, in the igniter composition, a binder additive, e.g., such as a silicone resin, effective to adhere the igniter composition to a surface within the inflator device.

The prior art generally fails to provide inflator device assemblies and igniter compositions useable therein which can operate as effectively as may be desired without including or requiring additional hardware such as igniter tubes, igniter cup assemblies or the like to hold or contain such igniter materials. At least partially as a result thereof, the prior art has generally failed to provide inflator device assemblies having a design of one or more of desired simplicity of construction and/or operation, reduced weight and reduced cost.

The invention further comprehends an improvement in an airbag inflator device which contains a quantity of gas generant material reactable to produce gas for inflation of an associated inflatable device and a quantity of an igniter material reactable to ignite at least a portion of the quantity of gas generant material. In accordance with one preferred embodiment of the invention, such improvement relates to the inclusion within the inflator device of a damper pad onto which pad at least a portion of the quantity of igniter material forms a coating.

The invention still further comprehends a method of including an igniter material within an inflator device. Such method, in accordance with one preferred embodiment of the invention, involves applying an igniter material composition which includes an igniter fuel, an igniter oxidizer and a binder additive effective to adhere the igniter material composition to an inner surface of the inflator device.

The invention yet still further comprehends a method of providing an igniter material for inclusion within an inflator device which contains at least one damper pad. In particular, such method includes coating a damper pad substrate with an igniter material composition which includes an igniter fuel, an igniter oxidizer and an additive effective to adhere the igniter material composition to the damper pad substrate.

Another general object of the invention can be attained, at least in part, through an inflator device which includes a closed storage chamber having contents including a quantity of an expandable fluid effective to provide a gaseous inflation medium. The inflator device also includes at least one exit opening wherethrough at least a portion of the gaseous inflation medium provided by the inflator device can exit the inflator device. The inflator device further includes an initiator device effective upon actuation to open the storage chamber and place at least a portion of the storage chamber contents in fluid communication with the at least one exit opening. In accordance with one preferred embodiment of the invention, a quantity of a pyrotechnic composition is disposed on a non-gas generant surface within the inflator device and which pyrotechnic composition is reactable upon initiation from the initiator device to augment at least one fill characteristic of the gaseous inflation medium. The pyrotechnic composition desirably includes a binder additive, such as a silicone resin, effective to adhere the pyrotechnic composition to a desired surface, e.g., a target surface, within the inflator device.

The prior art generally fails to provide inflator devices which while containing an expandable fluid effective to provide a gaseous inflation medium also includes a pyrotechnic material to enhance one or more fill characteristic of the gaseous inflation medium and wherein the pyrotechnic material is incorporated within the inflator in an as simple and effective a manner as may otherwise be desired.

The invention further comprehends an inflator device which includes a closed storage chamber which contains a dissociative gas source material fluid under an elevated pressure and which dissociative gas source material fluid is adapted to at least in part form a gaseous inflation medium. The inflator device also includes at least one exit opening wherethrough at least a portion of the gaseous inflation medium provided by the inflator device can exit the inflator device. The inflator device further includes an initiator device effective upon actuation to open the storage chamber, initiate dissociation of at least a portion of the dissociative gas source material to at least in part form a gaseous inflation medium, and place at least a portion of the gaseous inflation medium in fluid communication with the at least one exit opening. A quantity of a pyrotechnic composition is disposed on a non-gas generant surface within the inflator device and which pyrotechnic composition is reactable upon initiation from the initiator device to at least heat the gaseous inflation medium such as to initiate dissociation of at least a portion of the dissociative gas source material. In accordance with one preferred embodiment of the invention, both the at least one exit opening and the initiator device are disposed on a first end of the inflator device.

As used herein, references to an "expandable fluid" and the like are to be understood to refer to fluids such as when employed in inflator devices can be expanded to form a gaseous inflation medium. As will be appreciated, such fluids are typically present in an inflator device in a gaseous, liquid, or multi-phase form (i.e., a partially liquid and partially gaseous mixture). Expandable fluids can, for example, include one or more of a) an inert material such as one or more noble gases such as argon and helium, for example, b) materials such as nitrogen and carbon dioxide which are essentially inert under such processing conditions and c) dissociative gas source materials, such as nitrous oxide, for example, or various combinations thereof.

References to a "fill characteristic" or the like of a gaseous inflation medium resulting from an inflator device generally refers to one or more of the volume, amount and quantity of gas provided or resulting from the device. For example, as detailed below, augmentation of a fill characteristic of the gaseous inflation medium in accordance with the invention may involve reaction of a pyrotechnic composition to heat the gaseous inflation medium, provide additional gaseous reaction products or both.

The references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" (φ) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A/(F/O)_S \tag{1}$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

References herein to a "pyrotechnic" material, refer to a material which in its simplest form, consists of an oxidizing agent and a fuel that produce an exothermic, self-sustaining reaction when heated to the ignition temperature thereof.

References herein to a material or pyrotechnic composition or the like as being "fuel-rich" or "rich in fuel" generally refers to such material as contains or includes fuel in a relative amount, as compared to the amount of oxidizer therein contained, in excess of the theoretical stoichiometric amount which will undergo complete combustion, based on the amounts of fuel and oxidizer therein contained.

References to the detection or sensing of "occupant presence" are to be understood to refer to and include detection and sensing of one or more of the size, weight, and/or positions of a particular occupant under consideration.

References to an "adaptive" inflation system and the like are to be understood to refer to inflatable device inflation wherein selected inflatable devices are inflated or inflated in a manner generally dependent on selected operating conditions such as one or more of ambient temperature, occupant presence, seat belt usage, seat position of the occupant and rate of deceleration of the motor vehicle, for example.

References herein to an inflator device as being a "reverse flow" inflator are to be understood to generally refer to inflator devices wherein the exit area and the initiator device are both disposed on the same end of the inflator device.

Other objects and advantages will be apparent to those skilled in the art from the following detailed description taken in conjunction with the appended claims and drawings.

BRIEF DESCRIPTION OF THE DRAWINGS

FIGS. 9–11 are simplified, partially in section, schematic drawings illustrating sequential operation of an airbag inflator in accordance with one embodiment of the invention. More specifically, FIG. 9 illustrates airbag inflator in a normal or a "static" state. FIG. 10 illustrates the airbag inflator shown in FIG. 9 but now at an intermediate point in operation prior to reaction of a pyrotechnic coating therein provided. FIG. 11 illustrates the airbag inflator shown in FIG. 10 at a later still point in the operation thereof.

DETAILED DESCRIPTION OF THE INVENTION

Figure 1:
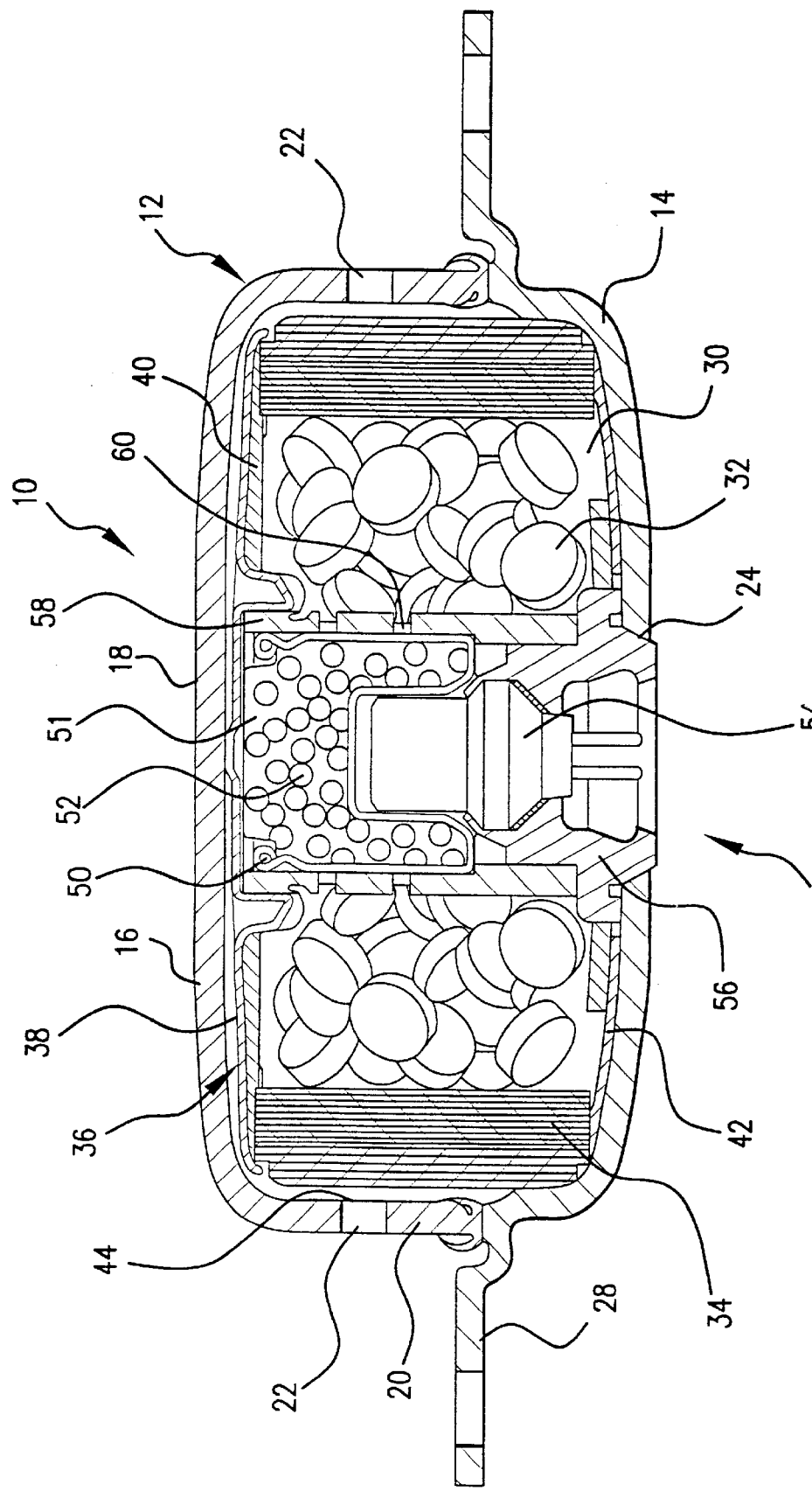
FIG. 1 is a simplified cross sectional view of a single stage inflator device as is known in the prior art.

The present invention provides improved igniter compositions, inflator devices and methods for including an igniter material within an inflator device such as suitable for use in the inflation of an inflatable device such as a vehicle occupant restraint airbag cushion. In accordance with certain preferred embodiments, the invention contemplates such igniter compositions which include a binder additive effective to adhere the igniter composition to a surface within the inflator device. In accordance with other preferred embodiments, the invention contemplates facilitating the incorporation or provision of a pyrotechnic material in an inflator device having or containing a quantity of an expandable fluid, such as to augment or enhance one or more fill characteristic of a resulting gaseous inflation medium.

As described in greater detail below, subject igniter compositions can desirably be applied such in the form of a coating onto the surface of the gas generant material. In at least certain other preferred embodiments of the invention, however, subject igniter compositions can desirably be applied to one or more non-gas generant surfaces within the inflator device, including, for example, damper pads, igniter cords and the like.

In accordance with a preferred embodiment of the invention, preferred binder additives for use in the practice of the invention desirably serve to bind together two or more of an igniter fuel material, an igniter oxidizer material or performance additive material such as in the form of a metal oxide such as may be included to improve either or both slag formation or burn rate properties or qualitites. In accordance with one embodiment, silicone resins can serve as useful such binder additives. Preferred such silicone resin additives for use in the practice of the invention are typically composed of a plurality of polysiloxane chains, such as of various molecular weights. For example, useful silicone resin additives include those composed of polysiloxane chains which have molecular weights in the range of 8000 to 80,000 grams per mole. As will be appreciated, useful silicone resins may contain or include various chemical groups such as methyl ($CH_3$), phenyl ($C_6H_6$) and propyl ($CH_2CH_2CH_3$), for example, bound to such polysiloxane backbone. Such resins are commonly identified as hydroxyl functional meaning that they include or contain a hydroxyl content (such as in the form of a silanol group) that desirably can undergo a condensation reaction such as to effect further or additional chain elongation and/or crosslinking. In practice, the use of such silicone resin additives having hydroxyl contents in the range of about 1% to about 10% by weight of resin material has been found useful in resulting in formulations which can conveniently provide or result in desired surface coverage upon the application of corresponding formulations. Further, while useful silicone resin additives may include or contain various contents of silicon bound to oxygen, in practice it is generally preferred that between about 60% and 75% of the silicon bonds contained in the resin additive be with or to oxygen atoms.

Specific silicone resin additives which may be used in the practice of the invention include: Dow Corning 6-2230 silicone resin of the Dow Corning Corporation; Wacker SilRes REN 100 silicone resin of Wacker Silicones Corporation of Wacker-Chemie GmbH; and General Electric SR355 silicone resin of GE Silicones of General Electric Company, for example.

As identified above, preferred binder additives for use in the practice of the invention desirably function as an adhesive effective to adhere the balance of an igniter composition to a surface within the inflator device. In one preferred embodiment of the invention, a desired binder additive, e.g., such as a silicone resin as identified above, is added to a suspension of igniter components in a suitable organic solvent, such as a solvent selected from the group of solvents consisting of alcohols, ketones, esters, aromatics and chlorinated organics. Ethanol and acetone are examples of quick drying organic solvents which, in accordance with certain preferred embodiments of the invention, are suitable for use in the practice of the invention.

The binder additive dissolves in the organic solvent and, in combination with the igniter components, a suspension is formed. The suspension can then be applied, desirably in the form of a coating of relative uniform thickness, onto a surface (sometimes referred herein as a "target surface") such as may occur or be present within a particular inflator device. As the organic solvent evaporates, the binder additive becomes tacky and serves to bind or adhere the balance of the igniter composition to the target surface. Upon completion of the drying process, a strong bond or otherwise effective joining or adhesion is formed between the igniter composition and the target surface. The preferred practice of the invention results in the desired adhesion or joining of the igniter material to the selected target surface without detrimentally impacting the ignitability of igniter material.

Further, in order to provide or result in suitable adherability for the igniter composition to a desired or selected target surface within an inflator device, preferred silicone resin binder additives for use in the practice of the invention have a solubility of at least one gram per 100 ml of organic solvent. In practice, preferred organic solvents are selected from the group of solvents consisting of alcohols, ketones, esters, aromatics and chlorinated organics.

While the amount of binder additive required for the desired functioning in the practice of the invention can vary dependent on factors such as the specific composition of the particular igniter material, it has been found generally desirable to include the selected binder additive, e.g., such as a selected silicone resin, in such an igniter composition in a relative amount of at least about 1 wt. % to no more than about 10 wt. %, based on the total composition weight of the igniter material (e.g., fuel, oxidizer and any other additives) and the binder additive.

While the broader practice of the invention is not limited to the inclusion and use of binder additives to specific igniter compositions, the inclusion and use of binder additives, such as silicone resin binder additives as described above, in accordance with the invention has been found particularly useful or practical with certain igniter compositions or certain igniter composition component materials.

In view thereof, particular igniter compositions for use in the practice of the invention include, as a primary fuel component an alloy of aluminum and magnesium (herein sometimes referred to as an "Al/Mg alloy"). It has been found that increasing the magnesium content of such fuel component generally results in the formulation having increased ignitability as well as increased sensitivity to impact, friction and electrostatic discharge. In view of the increased sensitivity of higher magnesium content formulations, an Al/Mg alloy which contains about 50 to about 90 wt. % Al and about 10 to about 50 wt. % Mg, preferably about 50 to about 80 wt. % Al and about 20 to about 50 wt. % Mg and, at least in certain preferred embodiments, more preferably an Al content of about 70 percent and a Mg content of about 30 percent, will generally be preferred. In accordance with certain preferred embodiments of the invention, between about 10 to about 60 weight percent of the binder additive-containing igniter composition generally constitutes such an Al/Mg alloy fuel component.

Further, preferred igniter compositions for use in the practice of the invention include an oxidizer component such as composed of strontium nitrate, an alkali metal nitrate (such as potassium nitrate, for example) or a combination thereof. It has been found generally desirable that the major oxidizer component be selected to assist in producing an easily filterable combustion product slag. In accordance with one preferred embodiment of the invention, at least about 50 wt. % up to 100 wt. % of the oxidizer component of the subject igniter composition comprises strontium nitrate. Strontium nitrate has been found to desirably produce condensible combustion products, such as strontium oxide, which have a relatively high-melting point. As will be appreciated, such high-melting temperature condensible combustion products can generally more easily be filtered or otherwise removed from the inflation gases produced or formed by an associated inflator device, as compared to igniter compositions, such as standard boron potassium nitrate, which produce or form low-melting temperature combustion products in relatively greater proportion.

Thus, an igniter composition in accordance with one preferred embodiment of the invention includes:

at least about 10 wt. % and no more than about 60 wt. % of an Al/Mg alloy igniter fuel;

at least about 30 wt. % and no more than about 80 wt. % of an igniter oxidizer selected from the group consisting of strontium nitrate, alkali metal nitrates and combinations thereof; and at least about 1 wt. % and no more than about 10 wt. % of a silicone resin additive effective to adhere the igniter composition to a surface within the inflator device, as described above.

As identified above, subject igniter compositions can desirably be applied such in the form of a coating onto the surface of the gas generant material. In at least certain other preferred embodiments of the invention, however, subject igniter compositions can desirably be applied to one or more non-gas generant surface within the inflator device, including, for example, damper pads, igniter cords and the like. Further, as will be appreciated, preferred target surfaces for use in the practice of invention are surfaces which already exist or are present within an inflator assembly. Through such use of an existing surface, igniter compositions in accordance with the invention can be included with desired inflator assemblies without requiring added elements to the assembly. Consequently and as further described below, the inflator assembly inclusion and use of such igniter compositions can desirably simplify the construction of the associated inflator assembly. Through such simplification, one or more of the cost, weight, size and/or performance dependability of the resulting inflator assembly can be favorably altered.

Practice and application of the invention, as well as at least some of the advantages associated or connected therewith, will be discussed in connection with FIGS. 3–8.

Figure 3:
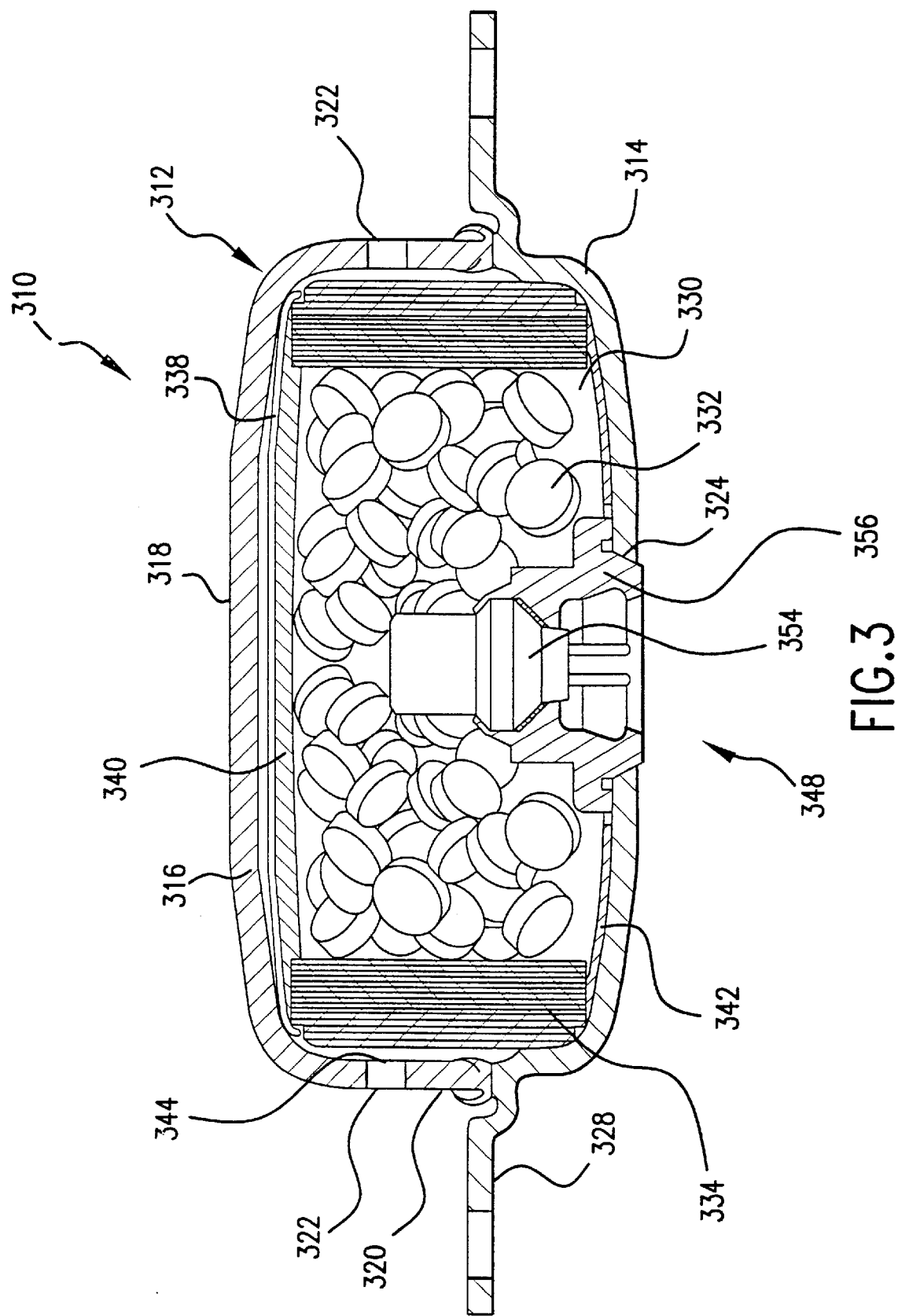
FIG. 3 is a simplified cross sectional view of a single stage inflator device in accordance with one embodiment of the invention.

FIG. 3 shows a simplified view of a single stage inflator device or assembly 310, in accordance with one embodiment of the invention. While the inflator assembly 310 is many respects similar to the inflator 10 described above, the inflator assembly 310 is significantly simplified in either or both construction and operation. In particular, the inflator assembly 310 avoids the need for an igniter cup (to hold or contain an igniter material), an igniter tube (wherethrough products of ignition can be passed through and directed into contact with an associated supply of gas generant material to effect ignition and reaction thereof) or a retainer (to hold or retain either of both such an igniter cup and igniter tube in a particular relative arrangement within an inflator assembly).

The inflator assembly 310, similar to the inflator 10, has a generally cylindrical external outline and includes a housing construction 312 such as formed of two structural components, i.e., a lower shell or base portion 314 and an upper shell or diffuser cap portion 316, such as may desirably be made of steel and appropriately joined or fastened together such as by application of an inertia welding operation. The housing 312 is illustrated in the general form of a flattened, disk-shaped circular cylinder having a length to diameter ratio of about 0.5 or less such as may most conveniently correspond to the shape of the vehicle steering wheel.

The diffuser cap portion 316 is in the general form of an inverted bowl and includes a top wall 318 and a cylindrical sidewall 320. The sidewall 320 includes a plurality of spaced, preferably, generally uniformly spaced gas exit ports 322. The base portion 314 includes a mounting opening 324 and a peripheral bracket 328 that extends radially outward from the housing 312 and serves to form an interface attachment which is used to attach the inflator assembly 310 to a vehicle, such as identified above.

The housing 312, similar to the housing 12, is configured to define a generally cylindrical chamber, here designated by the reference numeral 330. The chamber 330 contains or houses a supply of a gas generant material 332, such as composed of a pyrotechnic, such as known in the art, in a desired selected form. A filter assembly 334 such as described above surrounds the gas generant material 332.

The inflator assembly 310 includes a retainer 338, a diffuser damper pad 340 and a base damper pad 342 which serve as construction expedients such as to prevent undesired flow passage through the assembly 310 and avoid undesired rattle or contact of the gas generant 332 within the assembly 310. In practice and such as described above, such damper pad elements are commonly composed or fabricated of a glass fiber material or the like. The inflator assembly 310 differs from the inflator assembly 10, however, in that the diffuser damper pad 340 is coated with or otherwise contains or includes an igniter composition in accordance with the invention.

The assembly 310 also includes an adhesive-backed foil seal 344 surrounding the filter 334 and generally adjacent the inner surface of the sidewall 320 such as to preferably hermetically seal the gas generant material 332 within the inflator 310, thereby protecting the gas generant material from possibly damaging ambient conditions, such as including moisture.

The inflator assembly 310 further includes an igniter assembly, generally designated by the reference numeral 348, of reduced complexity, as compared to the igniter assembly 48 in the prior art inflator assembly 10, described above. The igniter assembly 348 may take the form of an igniter device or squib 354 and a squib adapter or holder 356 whereby the igniter squib 354 is mounted to or is mated with the housing 312 in a location within the chamber 330 via the mounting opening 324.

When actuated, the squib 354 causes ignition of the igniter material coated or otherwise contained or included in or on the diffuser damper pad 340. The products formed or resulting from such ignition are, through the designed configuration, in direct contact with the gas generant material 332 contained within the chamber 330 such as to result in the ignition and reaction of the gas generant material 332. The gases produced or formed by such reaction then pass through the filter 334 to rupture the foil seal 344 and pass through the gas exit ports 322 and out from the inflator assembly 310 into an associated airbag cushion (not shown).

As will be appreciated, the inflator assembly 310 eliminates the need for assembly elements such as an igniter cup and/or an igniter tube. Such elimination, in practice, can favorably reduce assembly weight, size and/or performance dependability and thus significantly alter, i.e., reduce, costs such as associated with inflator assembly manufacture, installation and/or operation, for example.

Figure 4:
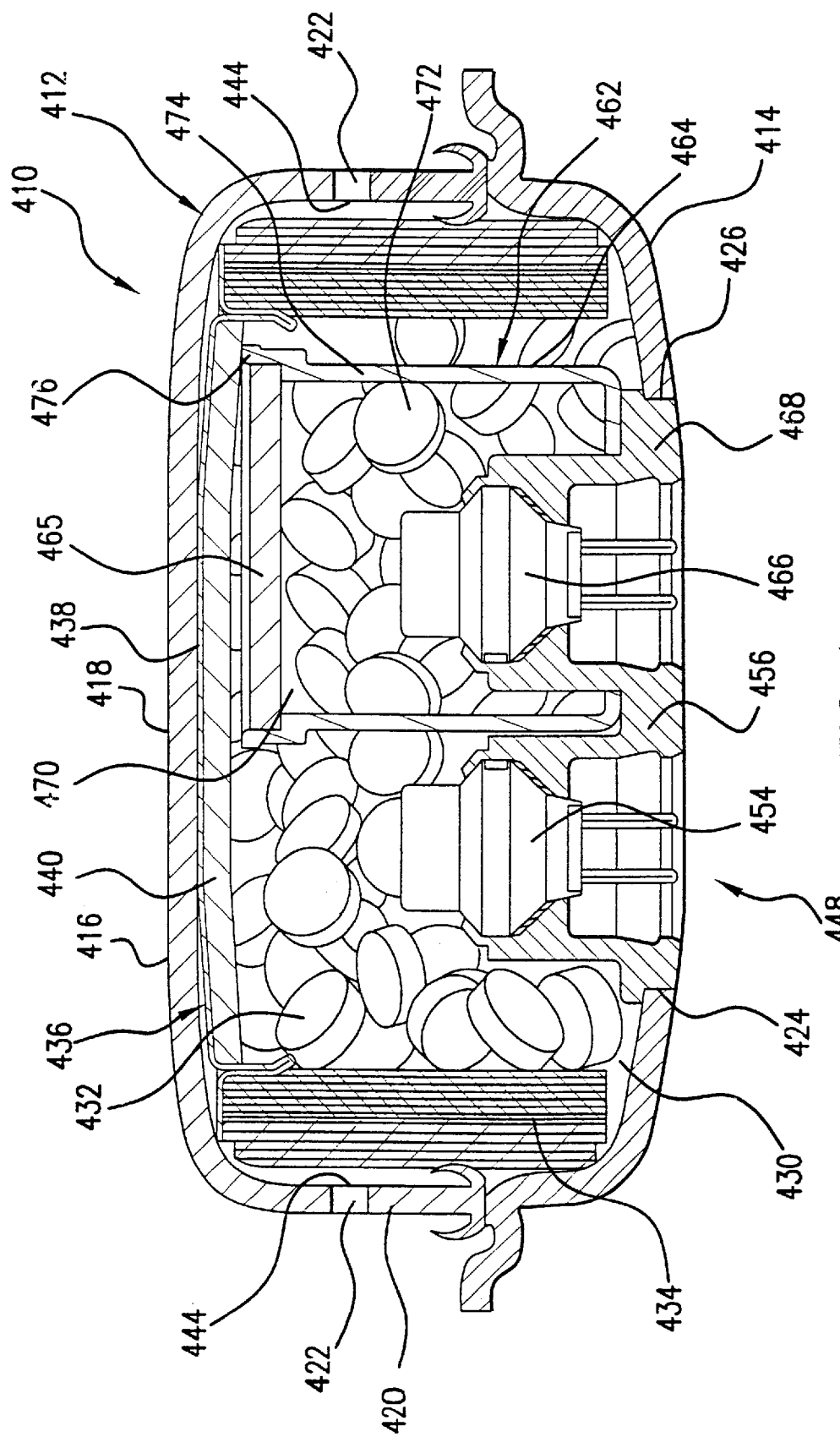
FIG. 4 is a simplified cross sectional view of a dual stage inflator device in accordance with one embodiment of the invention.

FIG. 4 shows a simplified view of a dual stage or adaptive inflator device or assembly 410, in accordance with one embodiment of the invention. While the inflator assembly 410 is in many respects similar to the inflator 210 described above, the inflator assembly 410 is significantly simplified in either or both construction and operation. In particular, the inflator assembly 410 avoids the need for an igniter cup (to hold or contain an igniter material) and an igniter tube (wherethrough products of ignition can be passed through and directed into contact with an associated supply of gas generant material to effect ignition and reaction thereof).

The inflator assembly 410, similar to the inflator assembly 210, includes a housing 412 in the general form of a flattened, disk-shaped circular cylinder having a length to diameter ratio of about 0.5 or less such as may most conveniently correspond to the shape of the vehicle steering wheel. The housing 412 is formed of a lower shell or base portion 414 and an upper shell or diffuser cap portion 416.

The diffuser cap portion 416 includes a top wall 418 and a cylindrical sidewall 420. The sidewall 420 includes a plurality of spaced gas exit ports 422. The base portion 414 includes first and second mounting openings, 424 and 426, respectively.

The housing 412 is configured to define a generally cylindrical first chamber 430 which contains or houses a supply of a first gas generant material 432, such as described above. A filter assembly 434 such as described above surrounds the first gas generant material 432.

Figure 2:
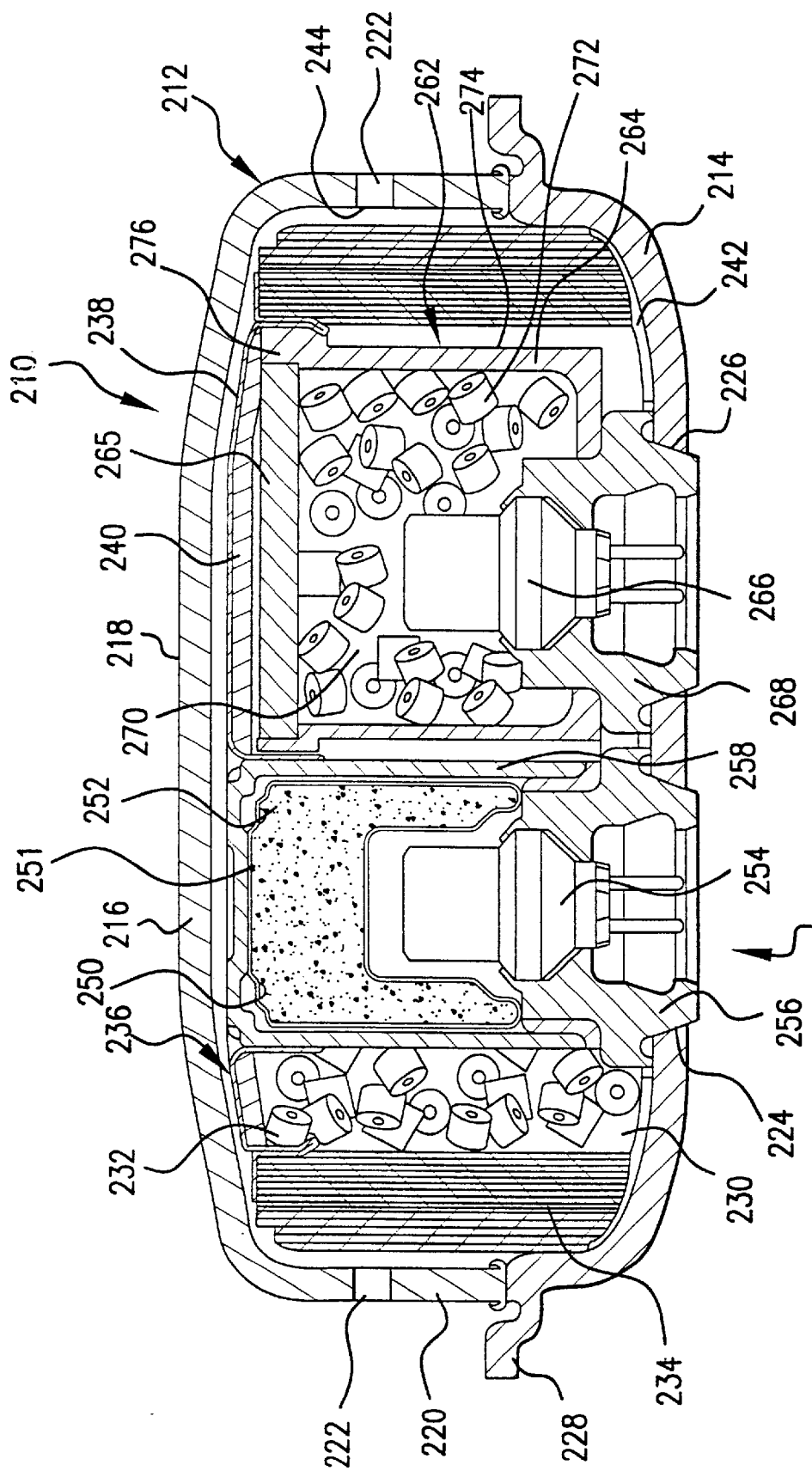
FIG. 2 is a simplified cross sectional view of a dual stage inflator device as is known in the prior art.

Further similar to the inflator assembly 210, the inflator assembly 410 also includes a retainer assembly 436 such as composed of a retainer 438 and a diffuser damper pad 440. The inflator assembly 410 also may, if desired, include a base damper pad (not shown) similar to the base damper pad 242, shown in FIG. 2. The diffuser damper pad 440, however, is coated or otherwise contains or includes, in accordance with the invention, with an igniter composition.

The assembly 410 also includes an adhesive-backed foil seal 444 surrounding the filter 434 and generally adjacent the inner surface of the sidewall 420 such as to preferably hermetically seal the gas generant material 432 within the inflator 410, thereby protecting the gas generant material from possibly damaging ambient conditions, such as including moisture.

The inflator assembly 410 further includes a first igniter assembly, generally designated by the reference numeral 448, of reduced complexity, as compared to the igniter assembly 248 in the prior art inflator assembly 210, described above. The igniter assembly 448 may take the form of an igniter device or squib 454 and a squib adapter or holder 456 whereby the igniter squib 454 is mounted to or is mated with the housing 412 in a location within the chamber 430 via the first mounting opening 424.

The first chamber 430 also houses or contains a second chamber 462 which similar to the chamber 262 in the inflator assembly 210 described above includes a gas generant cup 464, a lid closure 465, a second igniter device or squib 466, and a second squib adapter 468 whereby the second chamber 462 is mounted to or mates with the housing 412 at the second mounting opening 426.

Similar to the inflator assembly 210, the generant cup 464 and the lid closure 465 cooperate to form a generant cup interior 470 wherein is desirably placed a selected quantity of a second gas generant material 472. In particular, the generant cup 464 desirably includes a generally cylindrical sidewall 474 which includes a shoulder portion 476 formed therein and with which the lid closure 465 forms a press or interference fit form of attachment when in a static state or condition.

When actuated, the squib 454 causes ignition of the igniter material coated or otherwise contained or included in or on the diffuser damper pad 440. The products formed or resulting from such ignition are, through the designed configuration, in direct contact with the gas generant material 432 contained within the chamber 430 such as to result in the ignition and reaction of the gas generant material 432. The gases produced or formed by such reaction then pass through the filter 434 to rupture the foil seal 444 and pass through the gas exit ports 422 and out from the inflator assembly 410 into an associated airbag cushion (not shown).

As with the inflator assembly 310, the inflator assembly 410 in accordance with the invention eliminates the need for assembly elements such as an igniter cup and/or an igniter tube. Such elimination, in practice, can favorably reduce assembly weight, size and/or performance dependability and thus significantly alter, i.e., reduce, costs such as associated with inflator assembly manufacture, installation and/or operation, for example.

While the invention has been described above with respect to inflator assemblies wherein the ignition material of the invention is coated or otherwise applied on or in a damper pad contained within the inflator structure, it will be appreciated that the broader practice of the invention is not necessarily so limited. For example, in FIGS. 5 and 6, single and dual stage inflator assemblies, 510 and 610, respectively, similar to those described above are shown to identify various possible surfaces therewithin that can be appropriately coated or otherwise have applied thereto ignition material compositions in accordance with the invention.

Figure 5:
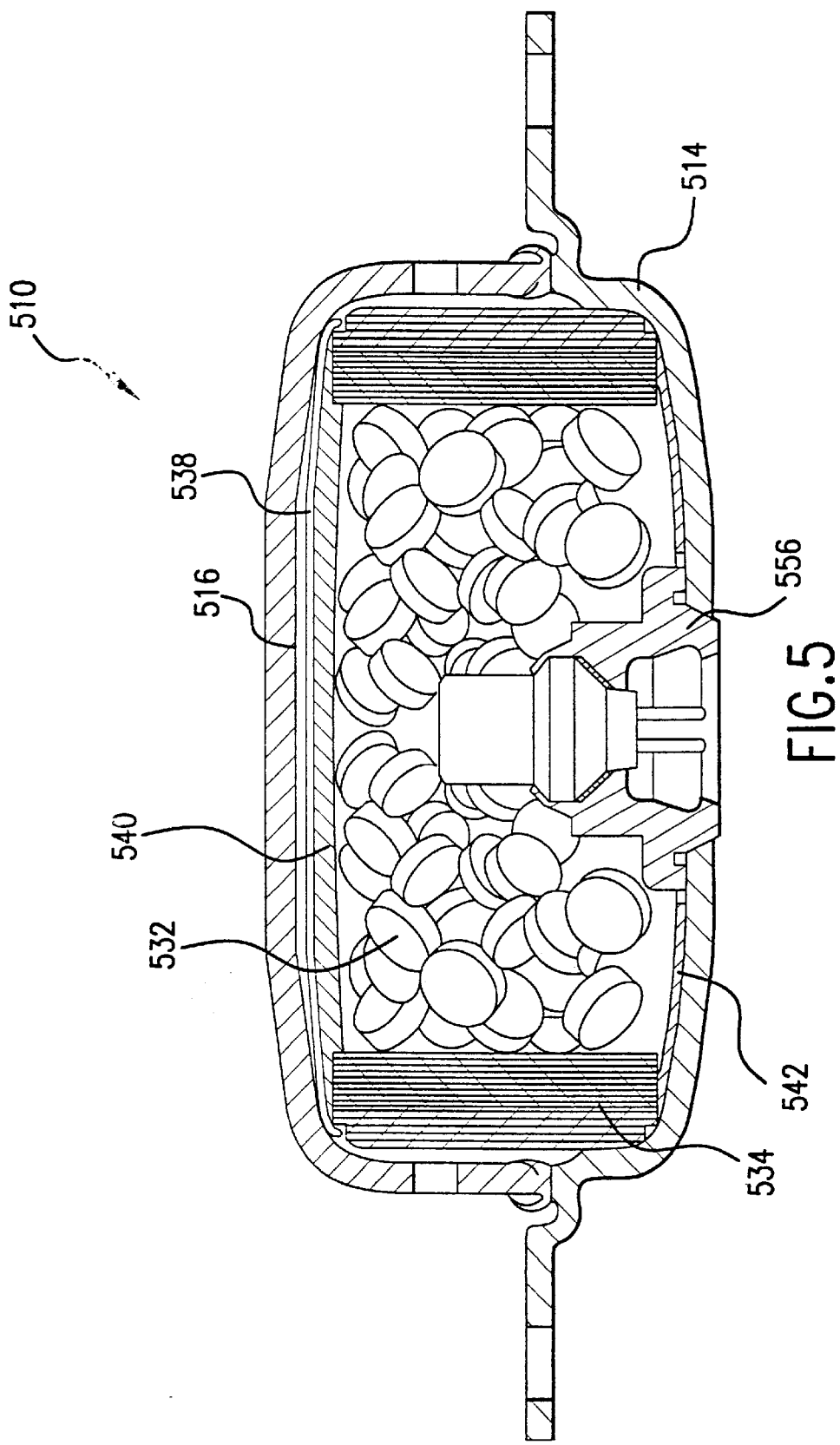
FIG. 5 is a simplified cross sectional view of a single stage inflator device, similar to the inflator device shown in FIG. 3 but now showing or identifying alternative surface locations to which a coating of an igniter composition in accordance with the invention can be applied.

Turning to FIG. 5, in the single stage inflator assembly 510, potential or candidate surfaces therewithin to which ignition material compositions in accordance with the invention can be applied may include, for example and without unnecessary limitation, one or more of the following surfaces: the inner surface of the lower shell or base portion 514, the inner surface of the upper shell or diffuser cap portion 516, the gas generant 532, the filter assembly 534; the retainer 538, the diffuser damper pad 540 (such as similar to as shown in FIG. 3), the base damper pad 542, the squib adapter or holder 556.

Figure 6:
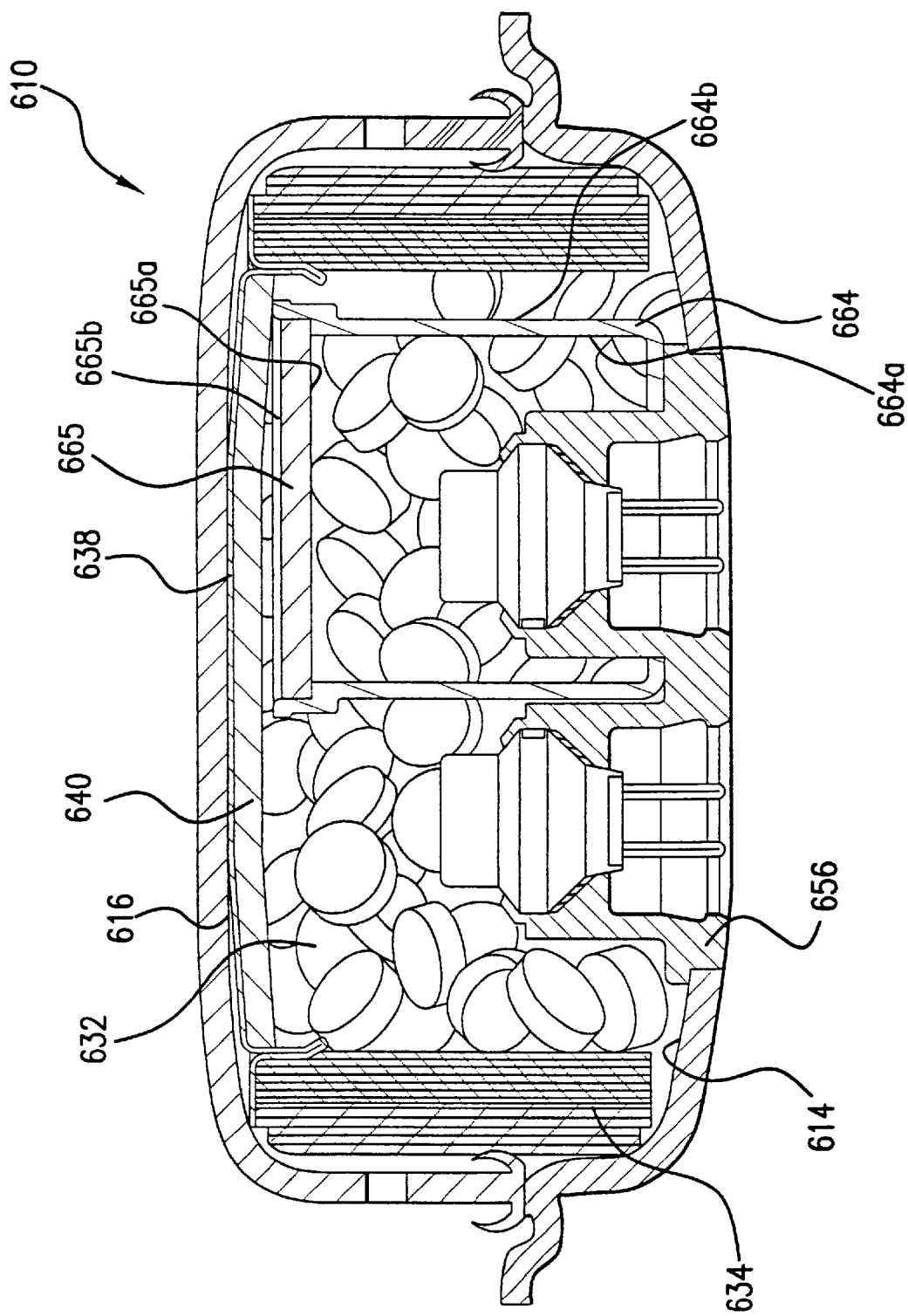
FIG. 6 is a simplified cross sectional view of a dual stage inflator device, similar to the inflator device shown in FIG. 4 but now showing or identifying alternative surface locations to which a coating of an igniter composition in accordance with the invention can be applied.

FIG. 6 shows that potential or candidate surfaces in the dual stage inflator assembly 610 to which ignition material compositions in accordance with the invention can be applied include: may include without unnecessary limitation one or more of the following surfaces: the inner surface of the lower shell or base portion 614, the inner surface of the upper shell or diffuser cap portion 616, the gas generant 632, the filter assembly 634; the retainer 638, the diffuser damper pad 640 (such as similar to as shown in FIG. 4), the squib adapter or holder 656, the inner surface 664a of the generant cup 664, the outer surface 664b of the generant cup 664, the inner surface 665a of the lid closure 665 and the outer surface 665b of the lid closure 665, for example.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1 and Comparative Examples 1 and 2

In each of these tests, 100 grams of igniter composition solids, as shown in TABLE 1, below, was mixed in 100 ml of a selected solvent, as also shown in TABLE 1, to form a solvent-igniter suspension. (Note: The Al/Mg alloy had an Al content of 70 weight percent and a Mg content of 30 weight percent.)

TABLE 1

| | IGNITER COMPOSITION (wt. %) | | | |
| --- | --- | --- | --- | --- |
| TEST | $SrNO_3$ | Al/Mg Alloy | Silicone Resin | SOLVENT |
| Example 1 | 67.21 | 30.79 | 2.00 | ethanol |
| Comp. Ex. 1 | 68.58 | 32.42 | — | ethanol |
| Comp. Ex. 2 | 68.58 | 32.42 | — | 10% water/ 90% ethanol |

The solvent-igniter suspensions of Example 1 and Comparative Examples 1 and 2 were then respectively spray applied at high pressure onto the surface of gas generant tablets of a gas generant formulation composed of 50.38 wt. % guanidine nitrate, 46.62 wt. % basic copper nitrate, 2.70 wt. % aluminum oxide, and 0.30 wt. % silicon dioxide. The gas generant tablets were of the following dimensions:

diameter=0.25 in thickness=0.080 in

In each case, 2.0% by weight of each igniter composition was sprayed onto the tablet surfaces. After spraying the coated tablets were dried under a stream of hot air.

Example 2 and Comparative Examples 3 and 4

In these tests, the adherence and retention of the coating of the igniter compositions onto gas generant tablets prepared in Example 1 and Comparative Examples 1 and 2, respectively, was measured and evaluated. In Example 2, the igniter coated gas generant tablets of Example 1 were tested. In Comparative Examples 3 and 4, the igniter coated gas generant tablets of Comparative Examples 1 and 2, respectively, were tested.

In each test, 50 grams of the respective igniter-coated gas generant tablets were placed on a 25-mesh screen and vibrated at high speed in a sieve shaker for 5 minutes. While the severity of such vibration was extreme, as compared to conditions which might normally be anticipated for typical vehicular gas generant-containing inflator installations, such testing was adequate to show relative differences among the samples.

Following such vibration treatment, the samples are weighed to determine the amount of weight loss. The weight loss was all attributed to loss of igniter material from the surface of the gas generant tablets and the percent of igniter material remaining on the surface was calculated. TABLE 2, below, reports for each of the tests, the percentage of igniter material remaining on the respective gas generant tablets following being subjected to such vibration treatment.

TABLE 2

| TEST | PERCENTAGE OF IGNITER MATERIAL REMAINING AFTER VIBRATION |
|---|---|
| Example 2 | 22.08 |
| Comp. Ex. 3 | 2.00 |
| Comp. Ex. 4 | 6.87 |

Discussion of Results

As the data in TABLE 2 shows, coating the gas generant tablets with the silicone resin-containing igniter composition in accordance with the invention, resulted or provided the best (i.e., greatest) retention of igniter material after subject to the vibration treatment. It is also noted that while the water containing solvent mixture used in Comparative Example 4 resulted in improved retention of igniter composition on the gas generant after vibration as compared to that resulting Comparative Example 3, the extent of igniter material retention was still significantly less than that obtained or provided through the practice of the invention.

Example 3 and Comparative Example 5

In these tests, the performance of the igniter-coated gas generant tablets of Example 1 and Comparative Example 1 were evaluated. In each of these tests, 32 grams of the respective igniter-coated gas generant tablets was loaded in an inflator simulator. The inflator simulator was provided with a pressure transducer to measure the pressure within the combustion chamber thereof. The combustion chamber pressure vs. time performance was recorded by means of a data collection system. Such pressure vs. time performance realized with the test inflator device, containing the igniter-coated gas generant tablets of Example 1 and Comparative Example 1, respectively, is shown in FIG. 7.

Discussion of Results

Figure 7:
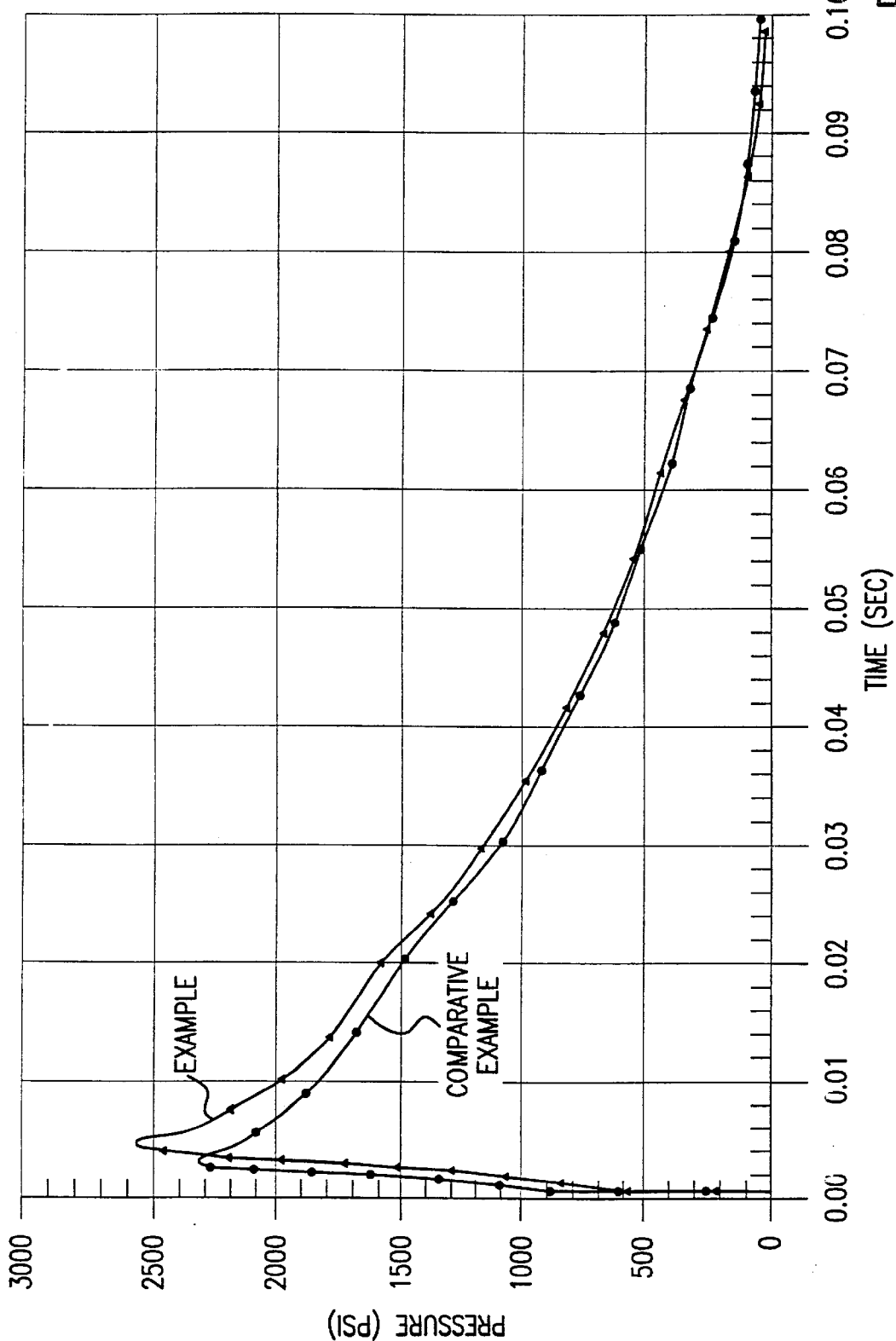
FIG. 7 is a graphical depiction of combustion chamber pressure as a function of time performance realized with the test inflator in Example 3 and Comparative Example 5.

As shown by FIG. 7, the performance of the igniter-coated gas generant tablets in Example 3 and Comparative Example 5 were very similar in terms of time to first pressure and rise rate. Thus, the data presented shows that equivalent performance and improved adherence are realized by incorporation of silicone resin binder in the igniter formulation, in accordance with the invention.

Example 4

In this example, a test inflator device similar in construction to the dual stage or adaptive inflator device or assembly 410 shown in FIG. 4 was used. The test inflator device contained 43 grams of a suitable gas generant material and the damper pad of the test device was spray coated with 1.5 grams of a silicone resin additive-containing igniter composition, in accordance with the invention. In particular, the igniter material used was of the following composition:

| | |
|---|---|
| 30.79 wt. % | Al/Mg alloy igniter fuel in the form of a solid solution having an Al content of 70 weight percent and a Mg content of 30 weight percent; |
| 67.21 wt. % | strontium nitrate igniter oxidizer; and |
| 2.0 wt. % | silicone resin binder additive. |

The test inflator device was mated to a 60-liter steel tank equipped with a pressure transducer, and the tank pressure vs. time performance obtained therewith recorded by means of the pressure transducer and associated data collection system. For purposes of this Example, the test inflator device was operated in a manner wherein only the first igniter assembly 448, and not the second igniter device or squib 466, was actuated and fired.

Figure 8:
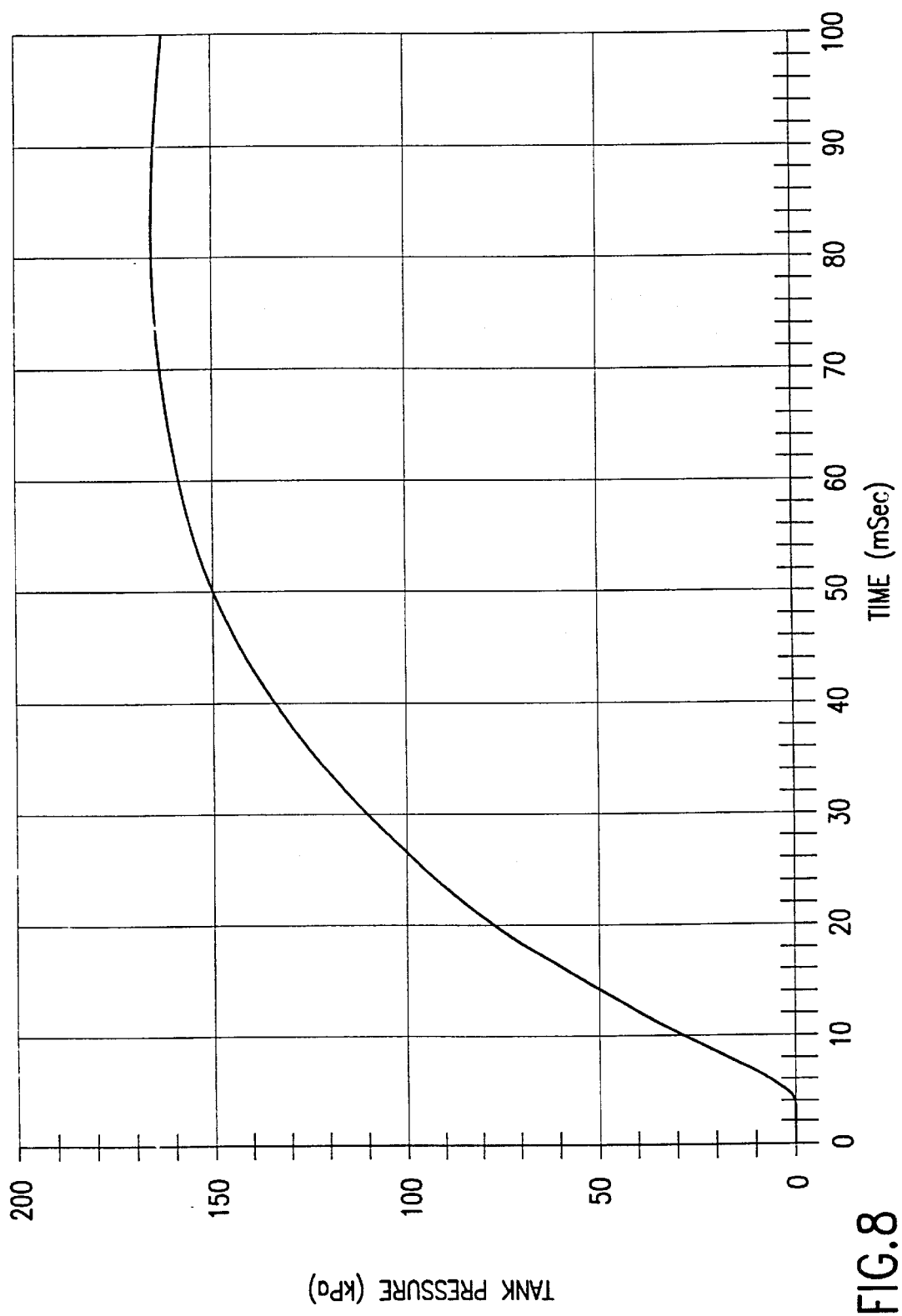
FIG. 8 is a graphical depiction of tank pressure as a function of time performance realized with the, test inflator in Example 4.

The tank pressure vs. time performance realized with the test inflator device is illustrated in FIG. 8.

Discussion of Results

As shown by FIG. 8, the test inflator with the simplified design and construction in accordance with the invention, provided tank pressure vs. time performance consistent with desired inflator operation. Thus, through practice of the invention, inflators of desirably simplified design and construction can be used to provide desired operation and performance.

In view of the above, the invention provides inflator device assemblies and igniter compositions useable therein such that avoid the need for inclusion of hardware such as igniter tubes, igniter cup assemblies or the like to hold or contain the igniter materials of the inflator device. At least partially as a result thereof, the invention provides inflator device assemblies having a design, construction or operation of increased simplicity, reduced weight and/or reduced cost.

As identified above, the present invention also provides inflator devices which in addition to containing an expandable fluid effective to provide a gaseous inflation medium also advantageously facilitate the incorporation or provision of a pyrotechnic material such as to augment or enhance one or more fill characteristic of a resulting gaseous inflation medium. Such an inflator device can be embodied in a variety of different structures. As representative, FIG. 9 illustrates the present invention as embodied in an apparatus or device, generally designated by the reference numeral 910, in accordance with one embodiment of the invention. Such a gas producing or supplying device can advantageously be used to effect the inflation of an inflatable device such as an inflatable vehicle occupant restraint, e.g., an inflatable airbag cushion, (not shown). As described above, such a gas producing or supplying device is commonly referred to as an inflator.

While the invention is described below with particular reference to a passenger airbag inflator apparatus such as can be used in association with various automotive vehicles including vans, pick-up trucks, and particularly automobiles, it is to be understood that the invention also has applicability not only with other types or kinds of vehicles including, for example, airplanes, and other types or kinds of airbag inflator apparatus for automotive vehicles including, for example, driver and side impact airbag assemblies but also for the inflation of various inflatable devices such as may be apparent to those skilled in the art. With respect to automotive vehicles it will also be appreciated that due to usual physical differences between passenger, side impact and driver airbag module assemblies, including the typical difference in size with passenger airbags generally being much larger than those used in side impact and driver assemblies, the invention may have particular initial utility in passenger airbag inflator apparatus. In addition, due to factors such as relatively large volume and extended stand-up times associated with inflatable devices of or in the form of inflatable curtains, inflation devices in accordance with the invention are believed to have particular practicality for use in conjunction with such inflatable devices, as are known in the art.

Returning to FIG. 9, the inflator device 910 includes a first or storage chamber 912 that is filled and pressurized with an expandable fluid, designated by the reference numeral 914. As described in greater detail below, such an expandable fluid is generally effective to provide a gaseous inflation medium such as may be used in the inflation of an associated inflatable device. In particular, such an expandable fluid may typically be in the nature of one or more compressed gases. As will be appreciated, such a compressed gas can be stored in a gaseous, liquid or multi-phase form (i.e., partially gaseous and partially liquid mixture). In view thereof, the first chamber 912 is sometimes referred to herein as a gas/liquid storage chamber or as simply a storage chamber and, in the case of an inflator operating with a dissociative material, a "dissociative" chamber. The premium on size generally placed on modern vehicle design, however, generally results in a preference for smaller sized airbag inflators. In view thereof and the fact that the densities for such compressed gas materials are significantly greater when in a liquid, rather than gaseous form, storage of such compressed gas materials primarily in a liquid form will typically be preferred.

A wide variety of expandable fluids can be used in accordance with various preferred embodiments of the invention. In practice, typical or usual expandable fluids useful in the practice of the invention may take the form or include a fluid under an elevated pressure such that the release of the fluid from the chamber and associated elevated pressure results in volumetric expansion of the fluid. In particular such preferred embodiments of the invention, such expandable fluids may include inert materials such as one or more noble gases such as argon and helium, for example, as well as materials such as nitrogen and carbon dioxide which are essentially inert under such processing conditions or various combinations thereof. In addition, the storage chamber may contain a quantity of gaseous helium to facilitate leak checking of the chamber such as in a manner well known in the art. A specific example of one such expandable fluid mixture or combination is a gaseous mixture composed of 95 mole percent argon and 5 mole percent helium.

In accordance with one particularly preferred embodiment of the invention, an expandable fluid used in the practice of the invention desirably includes or contains a dissociative gas source material. As disclosed in the above-identified Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, the dissociation products produced or formed upon the dissociation of nitrous oxide ideally are nitrogen and oxygen:

$$2N_2O=2N_2+O_2 \qquad (2)$$

Thus, not only does such reaction form products which are generally non-toxic and non-corrosive but also results in the production or formation of molecular oxygen. As will be appreciated, such oxygen may then be available for subsequent reaction such as may result in further or enhanced inflation gas production or formation.

It is also to be understood that while such nitrous oxide dissociative gas source material can be contained within the inflator storage chamber 912 in a pure form (e.g., such that the chamber contents include no more than minor levels of other materials, such as air as may be present in the chamber 912 prior to being filled with the dissociative gas source material), it may be preferred to include an inert gas therewith. For example, an inert gas such as helium can be included with nitrous oxide to facilitate leak checking of the inflator apparatus or, more specifically, of the dissociative chamber thereof. Alternatively or in addition, an inert gas, such as argon and helium, for example, as well as materials such as nitrogen and carbon dioxide which are essentially inert under such processing conditions or various combinations thereof can be included such as to supplement the gas produced or formed upon the dissociation of the nitrous oxide.

An expandable fluid containing about 50 mole percent nitrous oxide, about 40 mole percent carbon dioxide and about 10 mole percent helium is one specific example of an expandable fluid constituting a liquid and gas mixture in accordance with the invention.

Additionally or alternatively and as disclosed in the above-identified Rink, U.S. Pat. No. 5,884,938, the chamber 912 may contain a quantity of at least one radioactive isotope leak trace material whereby fluid leakage from the chamber can be detected, as disclosed therein.

In addition, if desired, the chamber 912 may additionally contain a quantity of oxygen gas such as in molecular form and such as may either or both beneficially or desirably supplement such molecular oxygen as may be formed upon the dissociation of stored or included nitrous oxide.

Still further, such a chamber 912 can, if and as desired, also include a sensitizer material to promote or accelerate the rate of such dissociative reaction. Various sensitizer materials disclosed and identified in above-identified Rink, U.S. Pat. No. 5,669,629. As disclosed therein, particularly useful sensitizer materials are typically hydrogen-bearing materials. Such sensitizer materials are generally added to the dissociative-gas source material in small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is a generally preferred hydrogen-bearing sensitizer material for use in the practice of the invention.

The chamber 912 has been identified above in terms of a storage chamber for the storage of an expandable fluid. As described in greater detail below, upon actuation and operation of the inflator 910, the chamber 912 may also desirably serve to provide a volume within which communication and heat transfer between combustion products formed in or by the inflator 910 and such stored expandable fluid may desirably occur.

The chamber 912 is defined by an elongated generally cylindrical closed end bottle 916. As shown, such a chamber bottle 916 includes a tubular sidewall 918 and has an open first end 920 and a closed second end 922. In practice, such a chamber bottle may desirably be formed in a one piece construction. As will be appreciated, such a construction desirably may serve to reduce or eliminate the number of welds needed or used in the construction such as by eliminating the need for the welding of an end closure such to close one or more ends of the resulting storage chamber.

The chamber bottle 916 may include a fill port (not shown), as is known in the art, wherethrough the expandable fluid 914 can be passed into the chamber 912. If included, such a fill port can be appropriately blocked or plugged, as is known, such as by a pin or ball, after the chamber 912 has been appropriately filled. As will be appreciated, such a fill port, if included in the inflator device, can alternatively be placed or positioned, as may be desired and understood by those skilled in the art. Thus, the broader practice of the invention is not necessarily limited to the inclusion of a fill port or the position or placement thereof.

In accordance with a preferred embodiment of the invention, a quantity of a pyrotechnic composition 923, as described in greater detail below, is disposed on a non-gas generant surface within the inflator device 910. For example and as shown, the pyrotechnic composition 923 is disposed along an inner surface 918a of the tubular sidewall 918 and an inner surface 922a of the closed second end 922.

The invention contemplates such pyrotechnic compositions which are similar to the igniter compositions described above. More particularly, for example, these pyrotechnic compositions desirably include a binder additive, such as a silicone resin such as described above, effective to adhere the pyrotechnic composition to a surface within an inflator device. As will be described in greater detail below and in accordance with certain preferred embodiments of the invention, subject pyrotechnic compositions can desirably be applied such in the form of a coating onto a non-gas generant surface within an inflator device.

In accordance with a preferred embodiment of the invention, preferred binder additives for use in the practice of the invention desirably serve to bind together two or more of a pyrotechnic composition fuel material, a pyrotechnic composition oxidizer material or performance additive material such as in the form of a metal oxide such as may be included to improve either or both slag formation or burn rate properties or qualitites. In accordance with one embodiment, silicone resins can serve as useful such binder additives.

Preferred such silicone resin additives for use in the practice of the invention are typically composed of a plurality of polysiloxane chains, such as of various molecular weights. For example, useful silicone resin additives include those composed of polysiloxane chains which have molecular weights in the range of 8000 to 80,000 grams per mole. As will be appreciated, useful silicone resins may contain or include various chemical groups such as methyl ($CH_3$), phenyl ($C_6H_6$) and propyl ($CH_2CH_2CH_3$), for example, bound to such polysiloxane backbone. Such resins are commonly identified as hydroxyl functional meaning that they include or contain a hydroxyl content (such as in the form of a silanol group) that desirably can undergo a condensation reaction such as to effect further or additional chain elongation and/or crosslinking. In practice, the use of such silicone resin additives having hydroxyl contents in the range of about 1% to about 10% by weight of resin material has been found useful in resulting in formulations which can conveniently provide or result in desired surface coverage upon the application of corresponding formulations. Further, while useful silicone resin additives may include or contain various contents of silicon bound to oxygen, in practice it is generally preferred that between about 60% and 75% of the silicon bonds contained in the resin additive be with or to oxygen atoms.

Specific silicone resin additives which may be used in the practice of the invention include: Dow Corning 6-2230 silicone resin of the Dow Coming Corporation; Wacker SilRes REN 100 silicone resin of Wacker Silicones Corporation of Wacker-Chemie GmbH; and General Electric SR355 silicone resin of GE Silicones of General Electric Company, for example and such as identified above.

Preferred binder additives for use in the practice of the invention also desirably function as an adhesive effective to adhere the balance of the pyrotechnic composition to a surface within the inflator device. In one preferred embodiment of the invention, the desired binder additive, such as a silicone resin, is added to a suspension of pyrotechnic components in a suitable organic solvent, such as a solvent selected from the group of solvents consisting of alcohols, ketones, esters, aromatics and chlorinated organics. Ethanol and acetone are examples of quick drying organic solvents which, in accordance with certain preferred embodiments of the invention, are suitable for use in the practice of the invention.

The binder additive dissolves in the organic solvent and, in combination with the pyrotechnic components, forms a suspension. The suspension can then be applied, desirably in the form of a coating of relative uniform thickness, onto a surface (sometimes referred herein as a "target surface") such as may occur or be present within a particular inflator device. As the organic solvent evaporates, the binder additive becomes tacky and serves to bind or adhere the balance of the pyrotechnic composition to the target surface. Upon completion of the drying process, a strong bond or otherwise effective joinder or adhesion is formed between the pyrotechnic composition and the target surface. The preferred practice of the invention results in the desired adhesion or joining of the pyrotechnic material to the selected target surface without detrimentally impacting the reactivity of the pyrotechnic material.

Further, in order to provide or result in suitable adherability for the pyrotechnic composition to a desired or selected target surface within an inflator device, preferred silicone resin binder additives for use in the practice of the invention have a solubility of at least one gram per 100 ml of organic solvent. In practice, preferred organic solvents are selected from the group of solvents consisting of alcohols, ketones, esters, aromatics and chlorinated organics.

While the amount of binder additive required for the desired functioning in the practice of the invention can vary dependent on factors such as the specific composition of the particular pyrotechnic material, it has been found generally desirable to include the selected binder additive, e.g., such as a selected silicone resin, in such a pyrotechnic composition in a relative amount of at least about 1 wt. % to no more than about 10 wt. %, based on the total composition weight of the pyrotechnic material (e.g., fuel, oxidizer and any other additives) and the binder additive.

While the broader practice of the invention is not limited to the inclusion and use of binder additives to specific pyrotechnic compositions, the inclusion and use of binder additives, such as certain silicone resin binder additives, in accordance with the invention has been found particularly useful or practical with certain pyrotechnic compositions or certain pyrotechnic composition component materials.

In view thereof, particularly preferred pyrotechnic compositions for use in the practice of the invention include, as a primary fuel component an alloy of aluminum and magnesium (herein sometimes referred to as an "Al/Mg alloy"). It has been found that increasing the magnesium content of such fuel component generally results in the formulation having increased ignitability as well as increased sensitivity to impact, friction and electrostatic discharge. In view of the increased sensitivity of higher magnesium content formulations, an Al/Mg alloy which contains about 50 to about 90 wt. % Al and about 10 to about 50 wt. % Mg, preferably about 50 to about 80 wt. % Al and about 20 to about 50 wt. % Mg and, at least in certain preferred embodiments, more preferably an Al content of about 70 percent and a Mg content of about 30 percent, will generally be preferred. In accordance with certain preferred embodiments of the invention, between about 10 to about 60 weight percent of the silicone resin additive-containing pyrotechnic composition generally constitutes such an Al/Mg alloy fuel component.

Further, preferred pyrotechnic compositions for use in the practice of the invention include an oxidizer component such as composed of strontium nitrate, an alkali metal nitrate (such as potassium nitrate, for example) or a combination thereof. It has been found generally desirable that the major oxidizer component be selected to assist in producing an easily filterable combustion product slag. In accordance with one preferred embodiment of the invention, at least about 50 wt. % up to 100 wt. % of the oxidizer component of the subject pyrotechnic composition comprises strontium nitrate. Strontium nitrate has been found to desirably produce condensible combustion products, such as strontium oxide, which have a relatively high-melting point. As will be appreciated, such high-melting temperature condensible combustion products can generally more easily be filtered or otherwise removed from the inflation gases produced or formed by an associated inflator device, as compared to inflator device incorporation and use of compositions which produce or form low-melting temperature combustion products in relatively greater proportion.

Thus, a pyrotechnic composition in accordance with one preferred embodiment of the invention includes:
- at least about 10 wt. % and no more than about 60 wt. % of an Al/Mg alloy fuel;
- at least about 30 wt. % and no more than about 80 wt. % of an oxidizer selected from the group consisting of strontium nitrate, alkali metal nitrates and combinations thereof; and
- at least about 1 wt. % and no more than about 10 wt. % of a silicone resin binder additive effective to adhere the pyrotechnic composition to a surface within the inflator device, as described above.

In accordance with certain preferred embodiments of the invention, the pyrotechnic composition employed in the practice of the invention is desirably fuel-rich. For example, such a fuel-rich pyrotechnic composition can desirably be employed in conjunction with an expandable fluid which contains or provides oxygen such as can react with the fuel material or component of the pyrotechnic composition. For example, in an inflator device in accordance with the invention wherein the expandable fluid is the dissociative gas source material nitrous oxide, nitrous oxide upon dissociation forms oxygen available for reaction with remaining fuel material.

An assembly, herein denominated a "diffuser assembly", generally designated by the reference numeral 924, is formed or appropriately joined or attached to the chamber bottle first end 920. For example, the chamber bottle first end 920 can be swagged and the diffuser assembly 924 joined thereto such as by means of an inertial weld (not shown).

The diffuser assembly 924 is a multi-component assembly such as may, at least in part, serve as, contain or hold a chamber opener 935, such as described in greater detail below and such as actuatable to produce a discharge effective to open the first chamber 912 by non-mechanical means, i.e., a discharge effective to open the first chamber 912 without necessitating the use of or reliance on mechanical opening devices such as projectiles or piston members, for example. In particular embodiments of the invention, such a discharge may be or take the form of a shock wave or other pressure disturbance, a hot product gas or other elevated temperature discharge or various combinations thereof, for example and as will be appreciated by those skilled in the art and guided by the teachings herein provided.

More specifically, the diffuser assembly 924 includes a housing 936 such as in the general form of a hollow tube side wall 940 having open first and second ends, 942 and 944, respectively. The side wall 940 includes a plurality of exit ports 946, wherethrough the inflation gas from the inflator 910 and, particularly the diffuser assembly 924, is properly dispensed into an associated airbag cushion (not shown). Thus, the diffuser assembly 924 can serve to facilitate direction and ballistic control of the inflation fluid from the inflator 910 into the associated inflatable airbag cushion. As will be appreciated by those skilled in the art, the number and positioning or placement of the exit ports can be selected to provide particular inflation performance characteristics required or desired in or of a particular inflator installation. In practice, four generally evenly circumferentially spaced exit ports have been found sufficient to generally provide a sufficiently even flow control of the inflation medium from the inflator into an associated airbag cushion and such as may facilitate the desired inflation thereof.

To the side wall first end 942, there is fitted or attached, such as by means of a weld, crimp or other appropriately selected manner, a first end closure 952. The first end closure 952 includes an opening 954 therein wherethrough an initiator device 956 such as forms, at least in part, a portion of the chamber opener 935, is appropriately attached. Particular initiator devices for use in the practice of the invention can include any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a suitable pyrotechnic charge.

The first chamber 912 is enclosed at the chamber bottle first end 920 by means of a burst disk 960 such as to desirably provide a leak-free seal for the expandable fluid 14 normally contained or stored within the chamber 912. In practice, the burst disk 960 is typically in the form of a thin disk such as fabricated or formed of a metal material such as Inconel 600 or Inconel 625. It will be appreciated that the burst disk can, if desired, include a score or the like such as to facilitate the desired opening of the burst disk. More specifically, such inclusion of a score can be helpful in more specifically locating or positioning the site at which the burst disk 960 will initially open upon the direction of the discharge from the initiator device 956 there against.

As will be appreciated, such burst disk scoring can take various forms such as known in the art. For example, such a burst disk may include a score in the form of a cross or a circle, such as may be desired or particularly suited for a specific installation. Further, such a score may take the form of an indentation, marking or otherwise reduction in the thickness of the burst disk at selected area or portion thereof, as is known in the art.

As will be appreciated, the inflator device 910, wherein the exit area, such as composed of the exit ports 946, and the initiator device 956 are both disposed on the same end of the inflator device is a reverse flow inflator. Those skilled in the art and guided by the teachings herein provided will appreciate that with such a reverse flow design, the number of components can be reduced or minimized as compared to typical or usual blowdown inflator designs. Consequently, the number of welds or the like required in the inflator can be reduced or minimized. Further, either or both the material and manufacturing costs can also be corresponding reduced or minimized.

Those skilled in the art and guided by the teachings herein provided will further appreciate that the diffuser assembly 924 may, if desired, additionally include a screen or like device interposed between the burst disk 960 and the exit ports 946. As will be appreciated, the inclusion of such a screen or like device may be desired or helpful in removing undesired particulates and the like from the inflation gas prior to passage out of the inflator 910, through the exit ports 946.

The manner of operation of an inflator apparatus in accordance with the invention will now be described in greater detail now also making reference to FIGS. 10 and 11. More specifically, FIGS. 9–11 schematically illustrate an inflator apparatus in accordance with one preferred embodiment of the invention at various selected points in the operation process thereof. In particular, FIG. 9 illustrates the inflator apparatus 910 in a "static" or what may be termed its normal state. FIG. 10 illustrates the same inflator apparatus (now designated 910') at an intermediate point in operation subsequent to actuation and prior to reaction of the pyrotechnic coating 923 therein provided. FIG. 11 illustrates the same inflator apparatus (now designated by the reference numeral 910") at a subsequent or still later point in the operation thereof.

As will be appreciated, in FIGS. 9–11, certain simplifications have been made to simplify illustration and discussion. For example, FIGS. 9–11 do not illustrate the inclusion of various welds or crimps such as may desirably be utilized in the joining together of the component parts of the inflator device.

Operation

Typical operation of the inflator apparatus 910, shown in FIG. 9, is as follows:

Upon the sensing of a collision, an electrical signal is sent to the chamber opener initiator 956. The initiator 956 functions to produce discharge products, schematically represented as lines 964 effective to result in the opening, such as by rupture or otherwise, of the burst disk 960, as shown in FIG. 10

With the rupture or otherwise opening of the burst disk, now signified by the reference numeral 960', a portion of the quantity of unheated expandable fluid 914 contained within the first chamber 912 is released from the first chamber 912, as signified by the lines 968. In particular, such released fluid is passed into the diffuser assembly 924 and ultimately out the exits ports 946 into an associated inflatable vehicle occupant restraint (not shown). As will be appreciated, where the expandable fluid 914 has been stored or confined under pressure within the chamber 912 in a liquid or at least partially liquified state, the opening of the chamber 912 will desirably result in the vaporization thereof.

Simultaneously with such opening of the burst disk, at least a portion of the initiator discharge products 964 flow into the first chamber 912. As will be appreciated, such initiator discharge products entering into the first chamber 912 must overcome the pressure gradient created by the expandable fluid originally contained within the first chamber 912. In view thereof, it may be desired or preferred to employ a larger or more powerful initiator device than may otherwise be desired.

As shown in FIG. 11, the initiator discharge products 964 pass into the chamber 912. The initiator discharge products contact and communicate with the contents of the storage chamber 912, including:

a. remaining expandable fluid 914 resulting in the heating of such fluid and further resulting in thermal expansion thereof and b. the pyrotechnic composition 923 disposed along the inner surface of the storage chamber 912 such as to result in reaction of at least a portion of the pyrotechnic composition 923 such as to generate either or both additional heat and reaction gases, such as signified by the lines 970.

The resulting hot gases are correspondingly passed or communicated with or through the initiator assembly 926 and ultimately out the exit ports 946 and into the associated inflatable vehicle occupant restraint (not shown).

As the pyrotechnic coating 923 is located on an inside surface of the inflator device storage chamber, the combustion reaction thereof can proceed essentially unperturbed by the low gas velocity characteristic of boundary layer flow. Moreover, the pyrotechnic coating 923 is in a position (e.g., upstream of the burst disk 960) such that some of the energy released through the combustion thereof will heat the expandable fluid remaining in the storage chamber 912 before exiting the chamber and undergoing subsequent adiabatic expansion cooling.

As will be appreciated by those skilled in the art and guided by the teachings herein provided, the subject inclusion of the pyrotechnic composition reactable upon initiation from the initiator device can desirably serve to augment at least one fill characteristic of the gaseous inflation medium, such as one or more of the volume, amount and quantity of gas provided or resulting from the device. For example, augmentation of a fill characteristic of the gaseous inflation medium in accordance with the invention may involve reaction of the pyrotechnic composition to heat the gaseous inflation medium, provide additional gaseous reaction products or both. In embodiments wherein the expandable fluid 914 stored or contained within the storage chamber 912 is or includes a dissociative gas source material such as nitrous oxide, the additional heat produced or provided by the reaction of the pyrotechnic coating 923 can induce, assist or otherwise aid in enhancing or furthering dissociation of the gas source material to further augment one or more fill characteristic of the gaseous inflation medium.

While the invention has been described above making specific reference to an embodiment wherein the pyrotechnic composition 923 is disposed along a inner surface 918a of the tubular sidewall 918 and an inner surface 922a of the closed second end 922 those skilled in the art and guided by the teachings herein provided will appreciate that the broader practice of the invention is not necessarily so limited. In general, such aspect of the invention can be practiced via embodiments wherein the pyrotechnic composition is otherwise appropriately disposed on a non-gas generant surface within the inflator device. For example, other specific embodiments of the invention include those wherein the pyrotechnic composition in accordance with the invention is disposed along one or more other non-gas generant surface within an inflator device, including, for example, damper pads, igniter cords and the like. Further, as will be appreciated, preferred target surfaces for use in the practice of invention are surfaces which already exist or are present within an inflator assembly. Through such use of an existing surface, pyrotechnic compositions in accordance with the invention can be included with desired inflator assemblies without requiring added elements to the assembly. Consequently, the inflator assembly inclusion and use of such pyrotechnic compositions can desirably simplify the construction of the associated inflator assembly. Through such simplification, one or more of the cost, weight, size and/or performance dependability of the resulting inflator assembly can be favorably altered.

While the invention has been described above making specific reference to an inflator device 910 wherein a pyrotechnic composition 923 is disposed on a non-gas generant surface therewithin such as along a inner surface 918a of the tubular sidewall 918 and an inner surface 922a of the closed second end 922 and such as in a generally uniform coating, it will be appreciated that the broader practice of the invention is not necessarily so limited. Further, those skilled in the art and guided by the teachings herein provided will appreciate that one or more fill characteristic of a gaseous inflation medium issuing forth from a respective inflator device in accordance with the invention can desirably be controlled or varied not only by or through the amount of a particular pyrotechnic composition disposed within the inflator device but also by or through the geometry or shape of the surface within the inflator device upon which the pyrotechnic composition is disposed.

Figure 12:
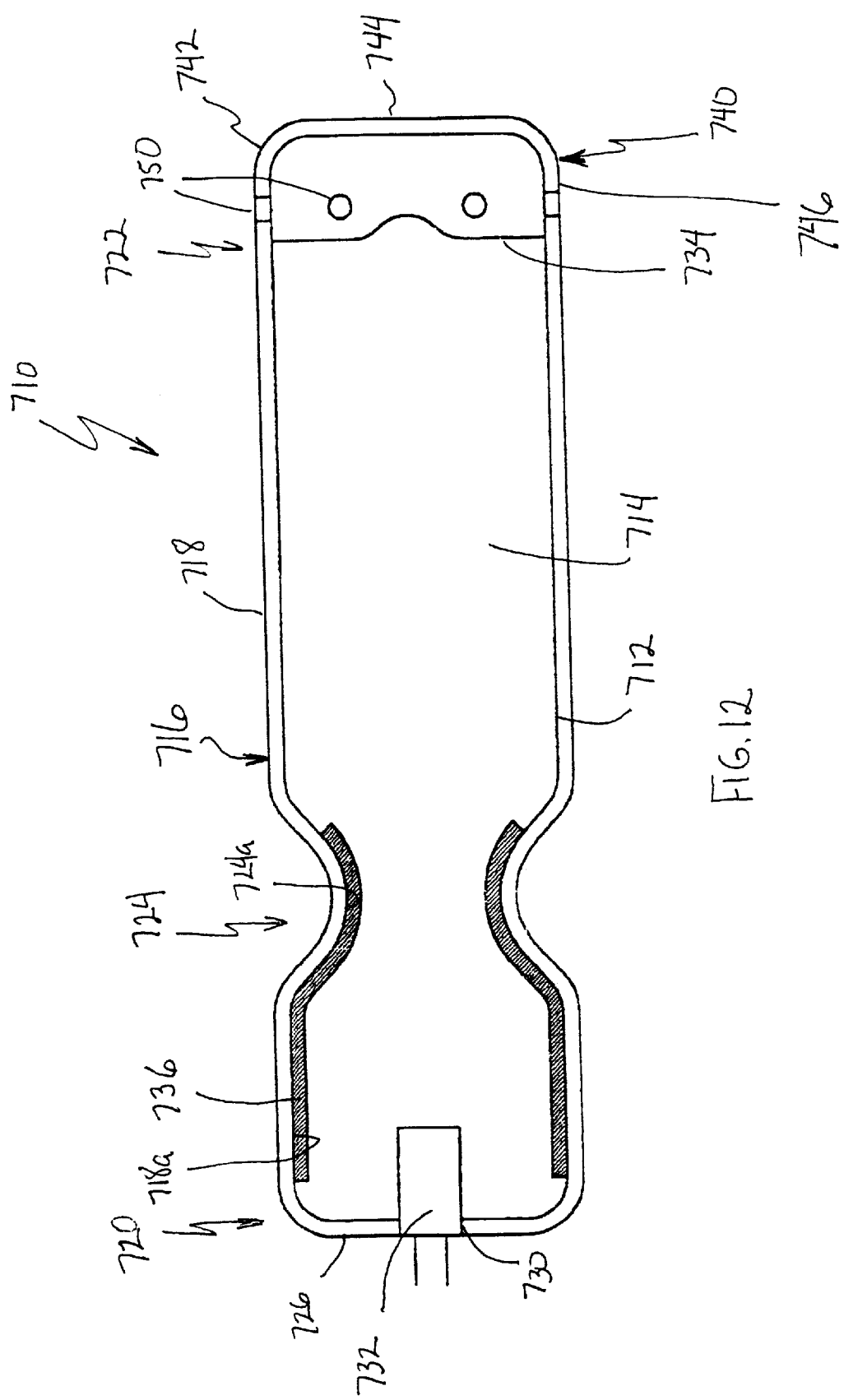
FIG. 12 is a simplified cross sectional view of an inflator device in accordance with another preferred embodiment of the invention.

For example, turning now to FIG. 12 there is illustrated a simplified cross sectional view of an apparatus or device, generally designated by the reference numeral 710, in accordance with another preferred embodiment of the invention and such as can advantageously be used to effect the inflation of an inflatable device such as an inflatable vehicle occupant restraint, e.g., an inflatable airbag cushion, (not shown). The inflator device 710, similar to the inflator device 910 described above, includes a first or storage chamber 712 that is filled and pressurized with contents 714 including an expandable fluid, such as described above.

As described above, such an expandable fluid is generally effective to provide a gaseous inflation medium such as may be used in the inflation of an associated inflatable device. In particular, such an expandable fluid may typically be in the nature of one or more compressed gases such as described above and such as can be stored in a gaseous, liquid or multi-phase form (i.e., partially gaseous and partially liquid mixture).

In addition and as also described above, such a chamber may, if desired, additionally contain a quantity of oxygen gas and/or a sensitizer material to promote or accelerate the rate of a dissociative reaction of one or more of the chamber contents.

The chamber 712 is defined by an elongated necked bottle 716. As shown, such a chamber bottle 716 includes a sidewall 718 and has a first end 720 and a second end 722. As shown and described in greater detail below, the bottle 716 includes a necked region 724 whereat the diameter of the bottle 716 is significantly reduced. The first end 720 includes a base wall 726 which has or includes an opening 730 therein wherethrough an initiator device 732, such as described above, is appropriately attached.

The chamber 712 is enclosed at the chamber bottle second end 722 by means of a burst disk 734 such as described above and such as to desirably provide a leak-free seal for the contents 714 normally contained or stored within the chamber 712.

In accordance with a preferred embodiment of the invention, a quantity of a pyrotechnic composition 736, such as described above, is disposed on a non-gas generant surface within the inflator device 710. For example and as shown, the pyrotechnic composition 736 is disposed along a inner surface 718a of the bottle sidewall 718, including an inner surface 724a of at least a portion of the necked region 724 whereat the diameter of the bottle 716 is significantly reduced.

A diffuser assembly, generally designated by the reference numeral 740, is formed or appropriately joined or attached to the chamber bottle second end 722. The diffuser assembly 740 includes a housing 742 such as in the general form of a cup having a base wall 744 and a cylindrically extending side wall 746. The side wall 746 includes a plurality of exit ports 750, wherethrough the inflation gas from the inflator 710 and, particularly the diffuser assembly 740, is properly dispensed into an associated airbag cushion (not shown).

As will be appreciated, the inflator device 710, wherein the initiator device 732 and the exit area, such as composed of the exit ports 750, are disposed on the opposite ends of the inflator device is of a type of inflator device commonly known or referred to as a "blowdown" inflator.

Operation

Typical operation of the inflator apparatus 710, shown in FIG. 12, is as follows:

Upon the sensing of a collision, an electrical signal is sent to the chamber opener initiator 732. The initiator 732 functions to produce discharge products, effective to heat or otherwise augment the expandable fluid originally contained within the chamber 712 as well as to result in initiation of reaction of the pyrotechnic composition 732 disposed on the inner surface 718a of the bottle sidewall 718. For example, the initiator discharge products contact and communicate with the contents 714 of the storage chamber 712, including:

a. the expandable fluid resulting in the heating of such fluid and further resulting in thermal expansion thereof and b. the pyrotechnic composition 732 disposed along a inner surface 718a of the bottle sidewall 718, including an inner surface 724a of at least a portion of the necked region 724 whereat the diameter of the bottle 716 is significantly reduced, such as to result in reaction of at least a portion of the pyrotechnic composition 732 such as to generate either or both additional heat and reaction gases.

When the pressure within the chamber 712 reaches a predetermined level to result in the opening, such as by rupture or otherwise, of the burst disk 734, gaseous inflation medium is passed into the diffuser assembly 740 and ultimately out the exits ports 750 into an associated inflatable vehicle occupant restraint (not shown).

Those skilled in the art and guided by the teachings herein provided will appreciate that both the rate and magnitude of heat introduction into the remaining contents of the chamber 712 will vary over time as the surface area of the pyrotechnic composition 736 remaining disposed on the bottle sidewall 718 changes over time. As will be appreciated, the rate of heat of such introduction will typically involve one or more of the following and likely interrelated factors: gas mass; gas velocity; exit area from the inflator device; pyrotechnic load; pyrotechnic type; pressure vessel surface area; and pressure area shape, for example. Further, while FIG. 12 has illustrated an inflator device 710 which incorporates a single surface area changing feature, e.g., the single necked region 724, it will be appreciated that multiple as well as more complex or intricate changes in surface area features can, if desired, be employed and are herein encompassed.

In view of the above, the invention successfully provides inflator devices which while containing an expandable fluid effective to provide a gaseous inflation medium also advantageously employ or incorporate a pyrotechnic material such as to augment or enhance such gaseous inflation medium.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator device comprising:

a closed storage chamber having contents including a quantity of an expandable fluid effective to provide a gaseous inflation medium, at least one exit opening wherethrough at least a portion of the gaseous inflation medium provided by the inflator device can exit the inflator device and an initiator device effective upon actuation to open the storage chamber and place at least a portion of the storage chamber contents in fluid communication with the at least one exit opening, wherein a quantity of a pyrotechnic composition is disposed on a non-gas generant surface within the inflator device, the pyrotechnic composition including a binder additive effective to adhere the pyrotechnic composition to a surface within the inflator device, the pyrotechnic composition reactable upon initiation from the initiator device to augment at least one fill characteristic of the gaseous inflation medium.

2. The inflator device of claim 1 wherein the binder additive comprises a silicone resin having a hydroxyl content in the range of about 1% to about 10% by weight.

3. The inflator device of claim 1 wherein the binder additive comprises a silicone resin having a solubility of at least one gram per 100 ml of organic solvent.

4. The inflator device of claim 1 wherein the pyrotechnic composition includes a fuel component comprising an Al/Mg alloy.

5. The inflator device of claim 1 wherein the pyrotechnic composition includes an oxidizer selected from the group consisting of strontium nitrate, alkali metal nitrates and combinations thereof.

6. The inflator device of claim 1 wherein the pyrotechnic composition comprises:

at least about 10 wt. % and no more than about 60 wt. % of an Al/Mg alloy fuel;

at least about 30 wt. % and no more than about 80 wt. % of an oxidizer selected from the group consisting of strontium nitrate, alkali metal nitrates and combinations thereof; and at least about 1 wt. % and no more than about 10 wt. % of the binder additive.

7. The inflator device of claim 1 wherein the at least one fill characteristic of the gaseous inflation medium augmented by reaction of the pyrotechnic composition is volume of gaseous inflation medium provided by the inflator device.

8. The inflator device of claim 7 wherein the volume of the gaseous inflation medium provided by the inflator device is augmented by the reaction of the pyrotechnic composition heating the gaseous inflation medium.

9. The inflator device of claim 7 wherein the volume of the gaseous inflation medium provided by the inflator device is augmented by the reaction of the pyrotechnic composition providing gaseous reaction products.

10. The inflator device of claim 1 wherein the at least one fill characteristic of the gaseous inflation medium augmented by reaction of the pyrotechnic composition is quantity of gas provided by the inflator device.

11. The inflator device of claim 1 wherein the pyrotechnic composition is disposed as a coating on a non-gas generant surface within the inflator device.

12. The inflator device of claim 11 wherein the pyrotechnic composition is disposed as a coating on an inner surface of the storage chamber.

13. The inflator device of claim 12 wherein the inner surface of the storage chamber is shaped to result in a controlled input of heat to the expandable fluid resulting from reaction of the pyrotechnic composition coating.

14. The inflator device of claim 1 wherein the expandable fluid comprises an inert gas.

15. The inflator device of claim 1 wherein at least a portion of the quantity of the expandable fluid is present in a liquid form when contained within the closed storage chamber.

16. The inflator device of claim 1 wherein the expandable fluid comprises a dissociative gas source material.

17. The inflator device of claim 16 wherein the pyrotechnic composition is fuel-rich.

18. The inflator device of claim 16 wherein the dissociative gas source material is nitrous oxide.

19. The inflator device of claim 18 wherein at least a portion of the nitrous oxide is present in a liquid form when contained within the closed storage chamber.

20. The inflator device of claim 1 wherein both the at least one exit opening and the initiator device are disposed on a first end of the inflator device.

21. An inflator device comprising:
    a closed storage chamber containing a dissociative gas source material fluid under an elevated pressure, the dissociative gas source material fluid adapted to at least in part form a gaseous inflation medium,
    at least one exit opening wherethrough at least a portion of the gaseous inflation medium provided by the inflator device can exit the inflator device,
    an initiator device effective upon actuation to open the storage chamber, initiate dissociation of at least a portion of the dissociative gas source material to at least in part form a gaseous inflation medium, and place at least a portion of the gaseous inflation medium in fluid communication with the at least one exit opening, and a quantity of a pyrotechnic composition disposed on a non-gas generant surface within the inflator device, the pyrotechnic composition reactable upon initiation from the initiator device to at least heat the gaseous inflation medium,
    wherein both the at least one exit opening and the initiator device are disposed on a first end of the inflator device.

22. The inflator device of claim 21 wherein the pyrotechnic composition includes a binder additive effective to adhere the pyrotechnic composition to a surface within the inflator device.

23. The inflator device of claim 22 wherein the binder additive is a silicone resin having a hydroxyl content in the range of about 1% to about 10% by weight and a solubility of at least one gram per 100 ml of organic solvent.

24. The inflator device of claim 21 wherein the pyrotechnic composition includes a fuel component comprising an Al/Mg alloy.

25. The inflator device of claim 21 wherein the pyrotechnic composition is disposed as a coating on an inner surface of the storage chamber.

26. The inflator device of claim 25 wherein the inner surface of the storage chamber is shaped to result in a controlled input of heat to the expandable fluid resulting from reaction of the pyrotechnic composition coating.

27. The inflator device of claim 21 wherein upon initiation from the initiator device the pyrotechnic composition is additionally reactable to provide gaseous reaction products and wherein at least a portion of the gaseous reaction products are included in the gaseous inflation medium.

28. The inflator device of claim 21 wherein the pyrotechnic composition is rich in fuel material.

29. The inflator device of claim 28 wherein dissociation of the dissociative gas source material forms a supply of oxidizer and wherein at least a portion of the oxidizer reacts with at least a portion of pyrotechnic composition fuel material to form additional gaseous reaction products.

30. The inflator device of claim 29 wherein the dissociative gas source material is nitrous oxide.

31. The inflator device of claim 21 wherein the dissociative gas source material is nitrous oxide.

* * * * *